(12) United States Patent
Shimatani

(10) Patent No.: US 8,681,386 B2
(45) Date of Patent: Mar. 25, 2014

(54) IMAGE READING APPARATUS AND FOREIGN MATTER DETECTION METHOD

(75) Inventor: Akira Shimatani, Osaka (JP)

(73) Assignee: Kyocera Document Solutions Inc. (JP)

( * ) Notice: Subject to any disclaimer, the term of this patent is extended or adjusted under 35 U.S.C. 154(b) by 28 days.

(21) Appl. No.: 13/605,514

(22) Filed: Sep. 6, 2012

(65) Prior Publication Data

US 2013/0063795 A1 Mar. 14, 2013

(30) Foreign Application Priority Data

Sep. 13, 2011 (JP) .................................. 2011-199186

(51) Int. Cl.
*H04N 1/04* (2006.01)
(52) U.S. Cl.
USPC ........... 358/3.26; 358/448; 358/474; 358/505
(58) Field of Classification Search
CPC ................................ H04N 1/4097; H04N 1/46
USPC .................. 358/3.26, 448, 474, 505, 1.9, 514
See application file for complete search history.

(56) References Cited

U.S. PATENT DOCUMENTS

| 2005/0083543 A1* | 4/2005 | Suzuki et al. ................... 358/1.9 |
| 2005/0185224 A1* | 8/2005 | Yoshizawa .................... 358/3.26 |
| 2011/0181919 A1* | 7/2011 | Okutsu ......................... 358/448 |

FOREIGN PATENT DOCUMENTS

JP 2011-49969 3/2011

* cited by examiner

*Primary Examiner* — Houshang Safaipour
(74) *Attorney, Agent, or Firm* — Gerald E. Hespos; Michael J. Porco; Matthew T. Hespos

(57) ABSTRACT

Acquiring image data for each color component by guiding the reflected light from a read position on a contact glass, to a line sensor for each color component, detecting a provisional foreign matter region in one image data, determining a first condition on the basis of the number of pixels constituting the provisional foreign matter region, determining a second condition on the basis of the average value of the density values of all of the pixels within the provisional foreign matter region when the first condition is satisfied, and determining whether or not foreign matter is present at a read position corresponding to the one color component when the second condition is satisfied on the basis of the density value of the pixel corresponding to the provisional foreign matter region in one other image data and the fourth reference value that has been set in advance.

16 Claims, 14 Drawing Sheets

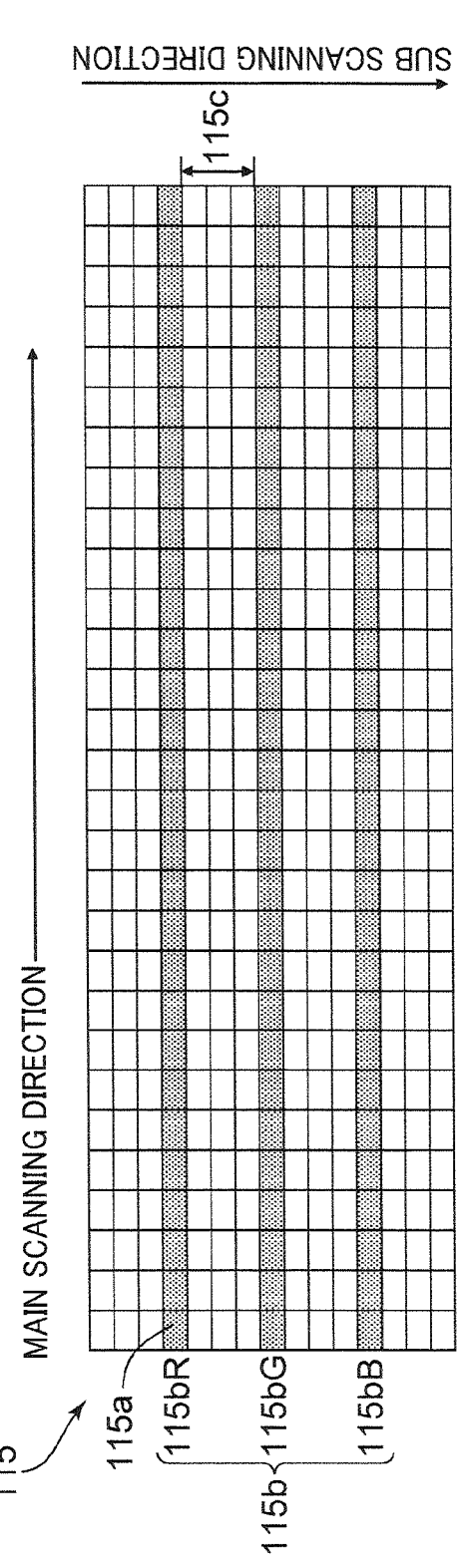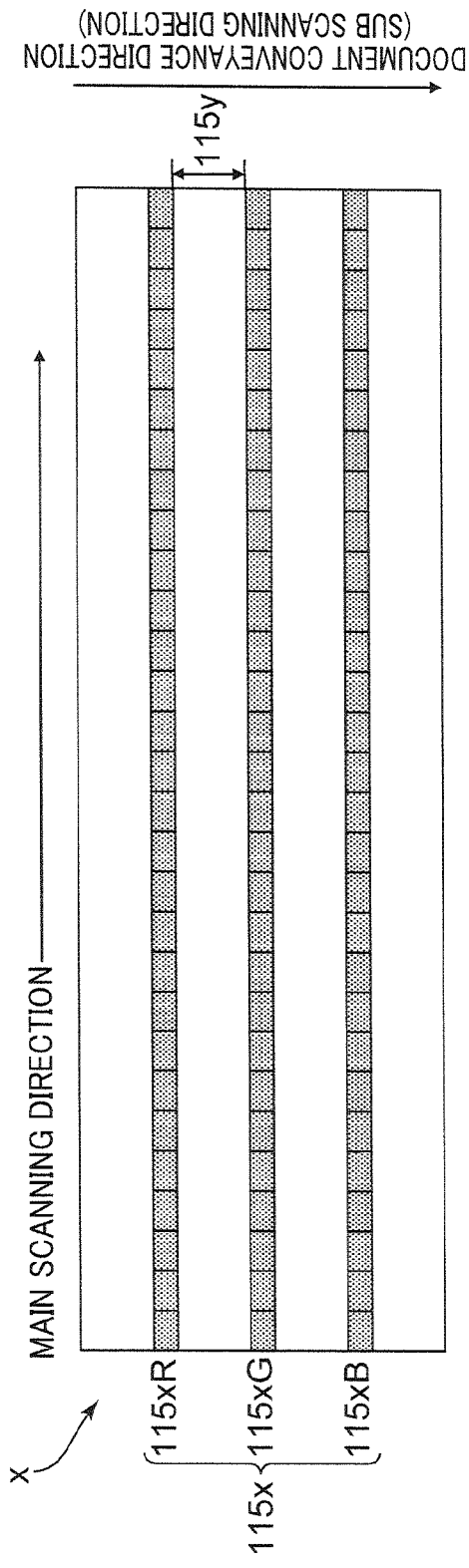

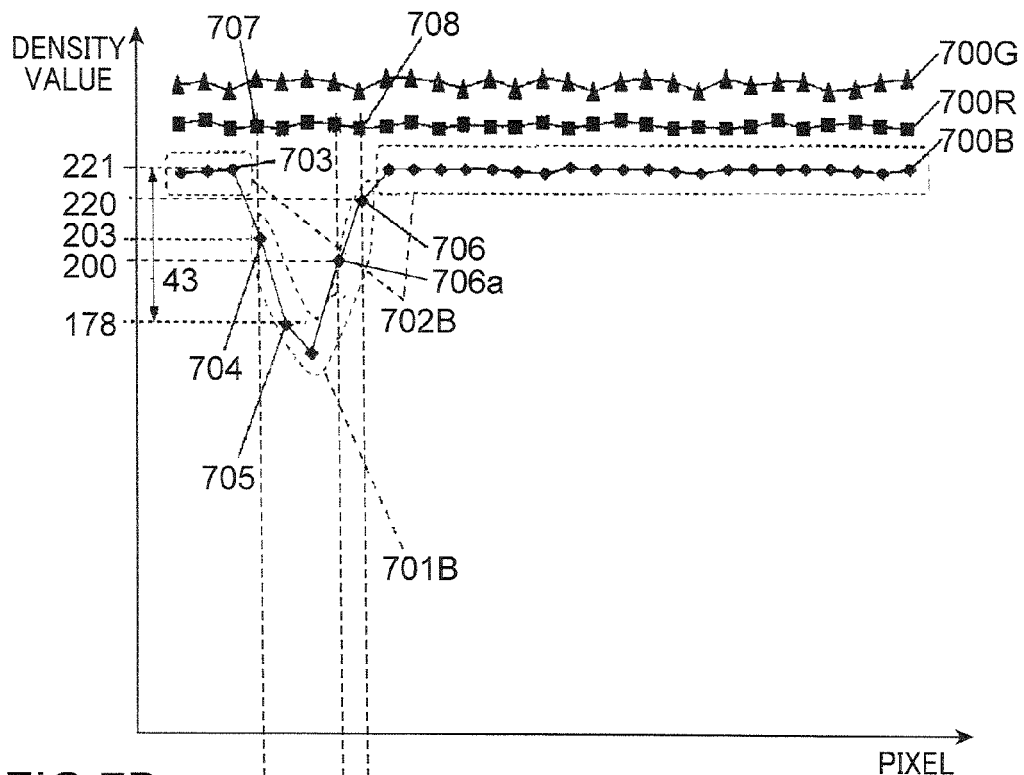
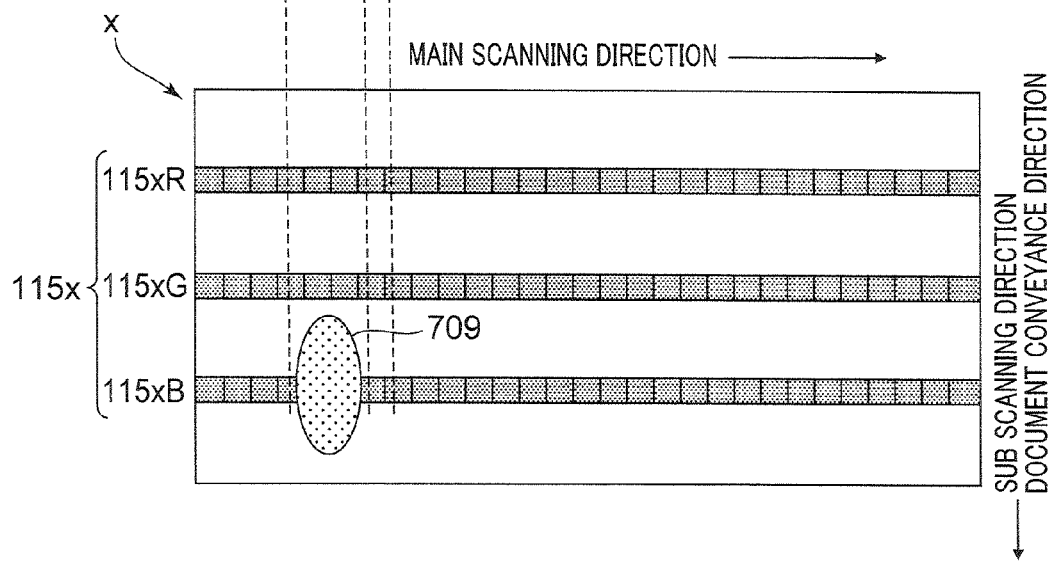

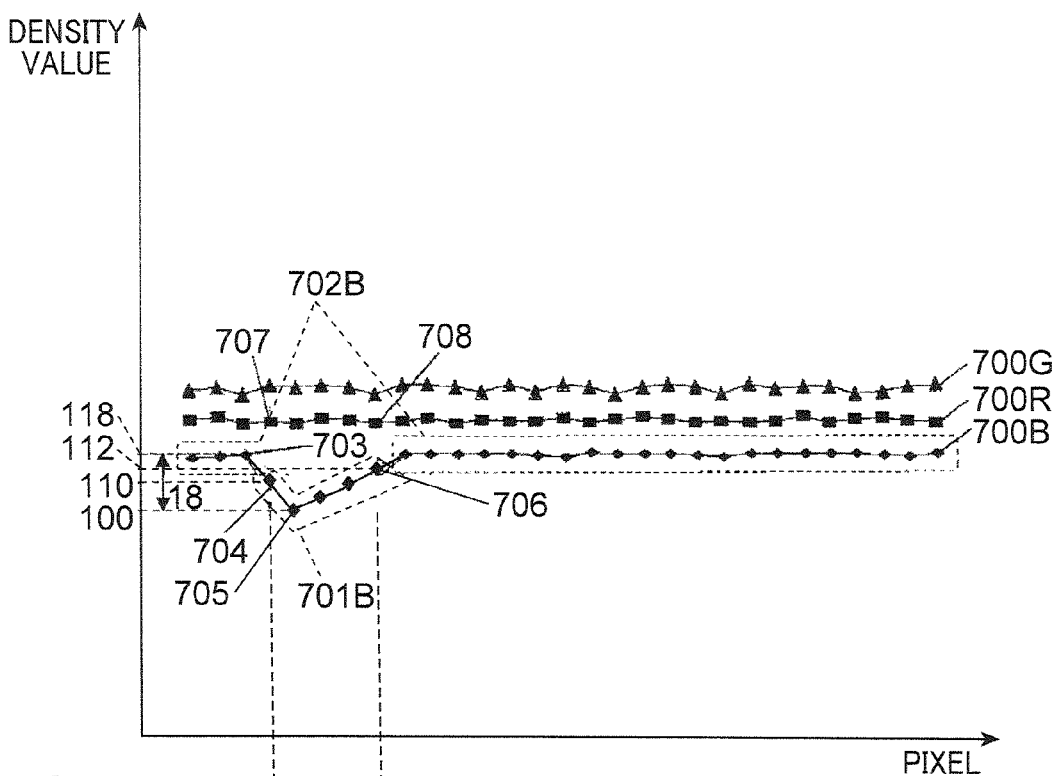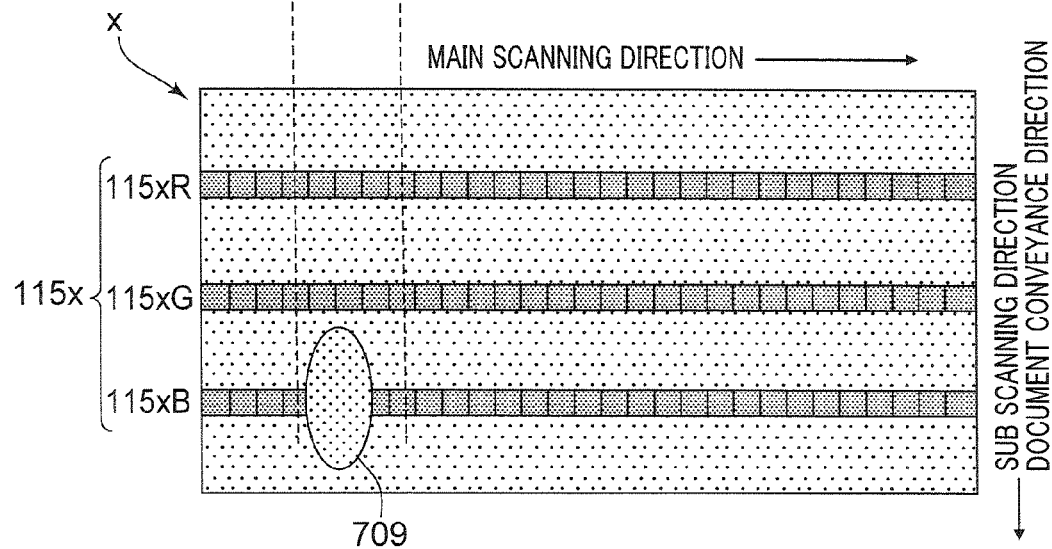

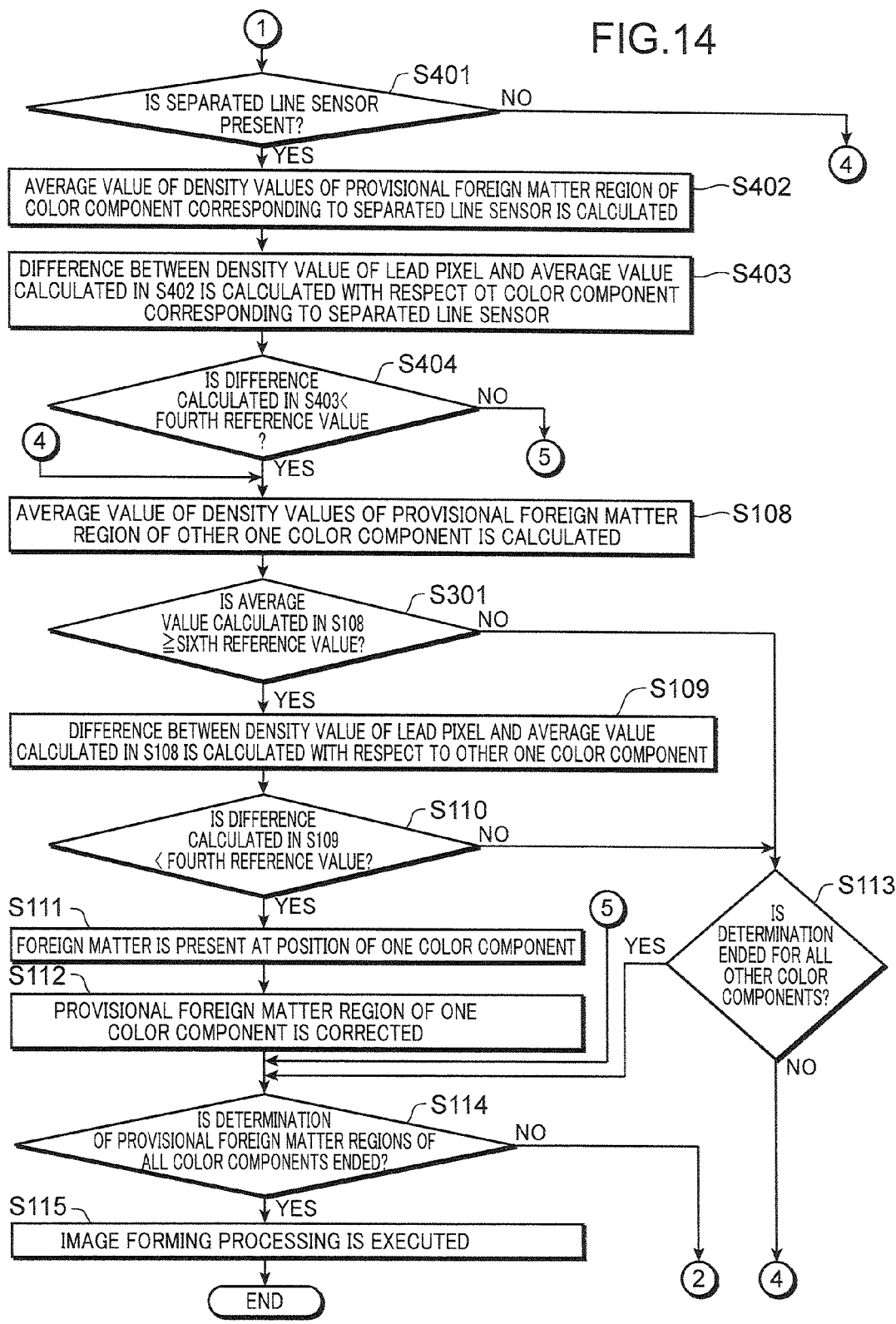

IMAGE READING APPARATUS AND FOREIGN MATTER DETECTION METHOD

INCORPORATION BY REFERENCE

This application is based upon Japanese Patent Application No. 2011-199186 filed on Sep. 13, 2011, the disclosure of which is incorporated herein by reference.

BACKGROUND

The present disclosure relates to an image reading apparatus and a foreign matter detection method, and more particularly to an image reading apparatus in which foreign matter that has adhered to the read position of an image obtained with a certain line sensor, from among the line sensors provided for all color components, can be adequately detected, and also to a foreign matter detection method for such an apparatus.

In an image reading apparatus such as a digital copier, a scanner, and a facsimile apparatus, two methods for reading a document image are mainly used. With the first method, a document is fixed to a placement position by placing on a glass table and the image is read by moving an optical system device (configuration with a movable optical system). With the second method, the position of the optical system device is fixed and the image is read, while the document is conveyed by a document conveying device (ADF: Auto Document Feeder) (configuration with a movable document).

In the configuration with a movable document, the read position during reading of an image is fixed at all times on the document table glass. Therefore, a problem occurring when adherent matter such as dust adheres to the document table glass when a document image is read with the configuration with a movable document is that the adhered matter becomes a streaky image in the sub scanning direction and appears in the image that has been read.

In order to resolve this problem, the image reading apparatus using the conventional technique is provided with a provisional foreign matter region detection means and a foreign matter determination means. The provisional foreign matter region detection means takes a pixel, for which the absolute value of the first-order derivative of image data of one color component selected from among the image data of each color component after the inter-line correction is above first reference value, as the lead pixel of a provisional foreign matter region. Then, the provisional foreign matter region detection means takes a pixel with image data equal to or greater than the image data of the lead pixel, from among the image data of the selected one color component, as the end pixel of the provisional foreign matter region. The provisional foreign matter region detection means thus detects the provisional foreign matter region. The foreign matter determination means determines whether or not a difference between the image data corresponding to the lead pixel of the provisional foreign matter region, from among the image data of other color components, and the average value of the image data corresponding to the provisional foreign matter region is less than a second reference value. By using the determination result, the foreign matter determination means determines whether or not foreign matter is present at the read position of the image obtained with a line sensor that has read the image data of the selected one color component.

With such image reading apparatus, whether the provisional foreign matter region detected from the image data of one color component is a region corresponding to foreign matter or a region corresponding to an image can be determined on the basis of density variations in the image data of other color components.

However, when the document including a high-density image is read and the detection of foreign matter that has adhered to the read position corresponding to the line sensors of some color components is performed by using the conventional technique, since the density variation amount caused by the foreign matter is small in the high-density image, it is sometimes impossible to distinguish clearly between the state in which density variations are caused by foreign matter and the case in which density variations are caused by the image design. As a result, a region corresponding to the original image can be erroneously determined as a region corresponding to foreign matter.

Accordingly, it is an object of the present disclosure to reduce the probability of erroneously detecting foreign matter that has adhered to the read position of a line sensor in an image reading apparatus.

SUMMARY

An image reading apparatus according to one aspect of the present disclosure includes an image data reading unit, a provisional foreign matter region detection unit, a first condition determination unit, a second condition determination unit, and a foreign matter determination unit. The image data reading unit has, for each color component, a line sensor in which a plurality of light-receiving elements corresponding to pixels are arranged one-dimensionally. The image data reading unit acquires image data for each color component in which an intensity of reflected light from a read position on a contact glass where a document is conveyed is converted into density values for each pixel by guiding the reflected light to the line sensors. When an adjacent density variation amount representing a variation amount of a density value between a target pixel and a pixel adjacent to this target pixel in image data of one color component selected from the image data of each color component exceeds a predetermined first reference value, the provisional foreign matter region detection unit takes the target pixel as a lead pixel. Then, in sequential comparison of a density value of each pixel arranged in series with the lead pixel with the density value of the lead pixel, the provisional foreign matter region detection unit takes the very first pixel having a density value equal to or greater than the density value of the target pixel as an end pixel. Then, the provisional foreign matter region detection unit detects a pixel group continuing from the lead pixel to the end pixel as a provisional foreign matter region in the image data of the one color component. When the provisional foreign matter region detection unit detects a provisional foreign matter region in the image data of the selected one color component, and the number of pixels constituting the provisional foreign matter region is less than a predetermined second reference value, the first condition determination unit determines that a first condition is satisfied. The first condition indicates that a foreign matter is present at a read position corresponding to a line sensor that has read the image data of the selected one color component. When the first condition is determined by the first condition determination unit to be satisfied and an average value of density values of all of the pixels within the provisional foreign matter region is equal to or greater than a predetermined third reference value, the second condition determination unit determines that a second condition is satisfied. The second condition indicates that foreign matter is present at a read position corresponding to the line sensor that has read the image data of the selected one color component.

The foreign matter determination unit performs a foreign matter determination processing. In the foreign matter determination processing, when the second condition is determined by the second condition determination unit to be satisfied, a difference between the density value of the pixel corresponding to the lead pixel in the provisional foreign matter region and an average value of the density values of the pixels corresponding to all of the pixels in the provisional foreign matter region in the image data of any one color component, from among color components other than the selected one color component, is calculated. When the calculated difference is less than a predetermined fourth reference value, it is determined that foreign matter is present at the read position corresponding to the line sensor that has read the image data of the selected one color component.

BRIEF DESCRIPTION OF THE DRAWINGS

FIG. 4A is a schematic diagram illustrating an example of the CCD line sensor according to the present disclosure, and FIG. 4B is a schematic diagram illustrating an example of read positions on the contact glass corresponding to the CCD line sensors shown in FIG. 4A;

FIG. 7A is a graph illustrating an example of image data of each color component obtained when a foreign matter has adhered to the "B" read position, and FIG. 7B is a schematic diagram illustrating an example of read positions of each color component on the contact glass corresponding to image data of each color component shown in FIG. 7A;

FIG. 11A is a graph illustrating the image data of each color component in the case where foreign matter has adhered to the "B" read position in an example other than that illustrated by FIG. 7A and FIG. 8A, and FIG. 11B is a schematic diagram illustrating an example of read positions of each color components on the contact glass corresponding to the image data of each color component shown in FIG. 11A;

FIG. 14 is an operation flowchart of the processing of detecting the foreign matter that has adhered to the read position of a certain line sensor in examples other than those shown in FIGS. 6, 10, and 12.

DETAILED DESCRIPTION

[First Embodiment]

An embodiment of the image reading apparatus according to the present disclosure is described below with reference to the appended drawings. In the present embodiment, the image reading apparatus is an all-in-one machine in which functions of a copier, a scanner, a fax machine, and a printer are combined together.

<Image Reading Apparatus>

Figure 1:
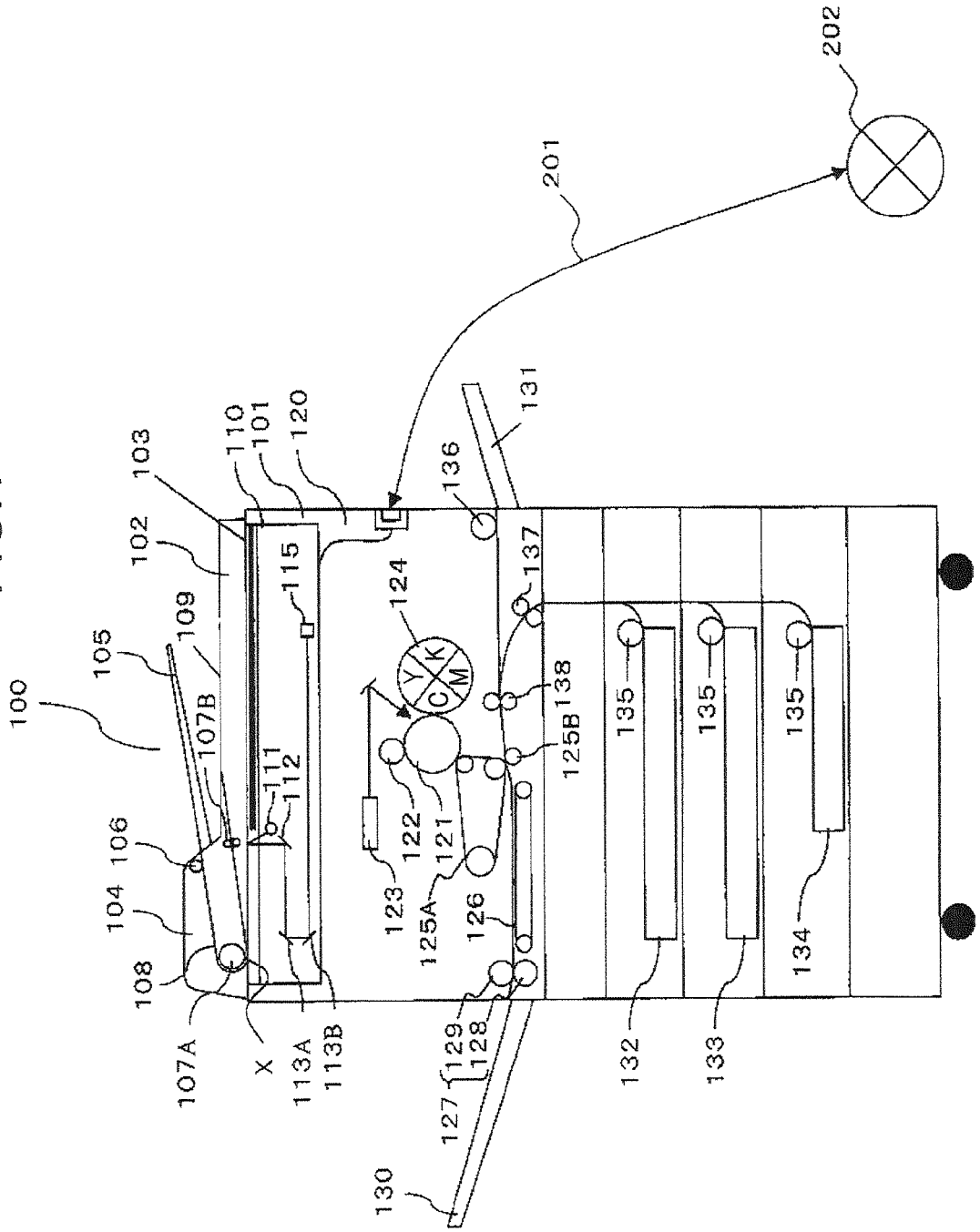
FIG. 1 is a vertical sectional view illustrating an example of the configuration of the all-in-one machine as an example of the image reading apparatus according to the present disclosure.

The schematic configuration of an all-in-one machine 100 is described below, for example, on the basis of the operation of the all-in-one machine 100 in the case in which a copy function is used. FIG. 1 is a vertical sectional view illustrating an example of the configuration of the all-in-one machine 100 as an example of the image reading apparatus according to the present disclosure. As shown in FIG. 1, when the user copies a document, the document is disposed on a contact glass 103 or a placement table 105. The user inputs a copy function start instruction at an operation panel provided close to the placement table 105. Where the copy function start instruction is inputted, the operation of the below-described drive units is initiated and the process of copying the document is started.

The all-in-one machine 100 is provided with a main body 101 and a platen cover 102 attached above the main body 101. The contact glass 103 is provided at the upper surface of the main body 101. The contact glass 103 is covered by closing the platen cover 102 that can be opened and closed. The platen cover 102 is provided with an automatic document feeder 104, the placement table 105, and a paper discharge table 109.

The automatic document feeder 104 is provided with a document conveyance path 108 formed inside the platen cover 102, a pick-up roller 106 provided inside the platen cover 102, and conveyance rollers 107A, 107B. The document conveyance path 108 is the conveyance path of the document. In the document conveyance path 108, the document is conveyed from the placement table 105 to the paper discharge table 109 via a read position X provided in the main body 101. When the document is conveyed to the read position X, the document is read by a reading unit 110.

In the automatic document feeder 104, the documents placed on the placement table 105 are pulled out one by one by the pick-up roller 106 toward the conveyance path 108. In the automatic document feeder 104, the pulled-out documents are conveyed to the conveyance path 108 by the conveyance rollers 107A, 107B. The documents are thus caused to pass through the reading position X and discharged to the paper discharge table 109. When the document passes through the reading position X, the document is read by the reading unit 110.

Figure 2:
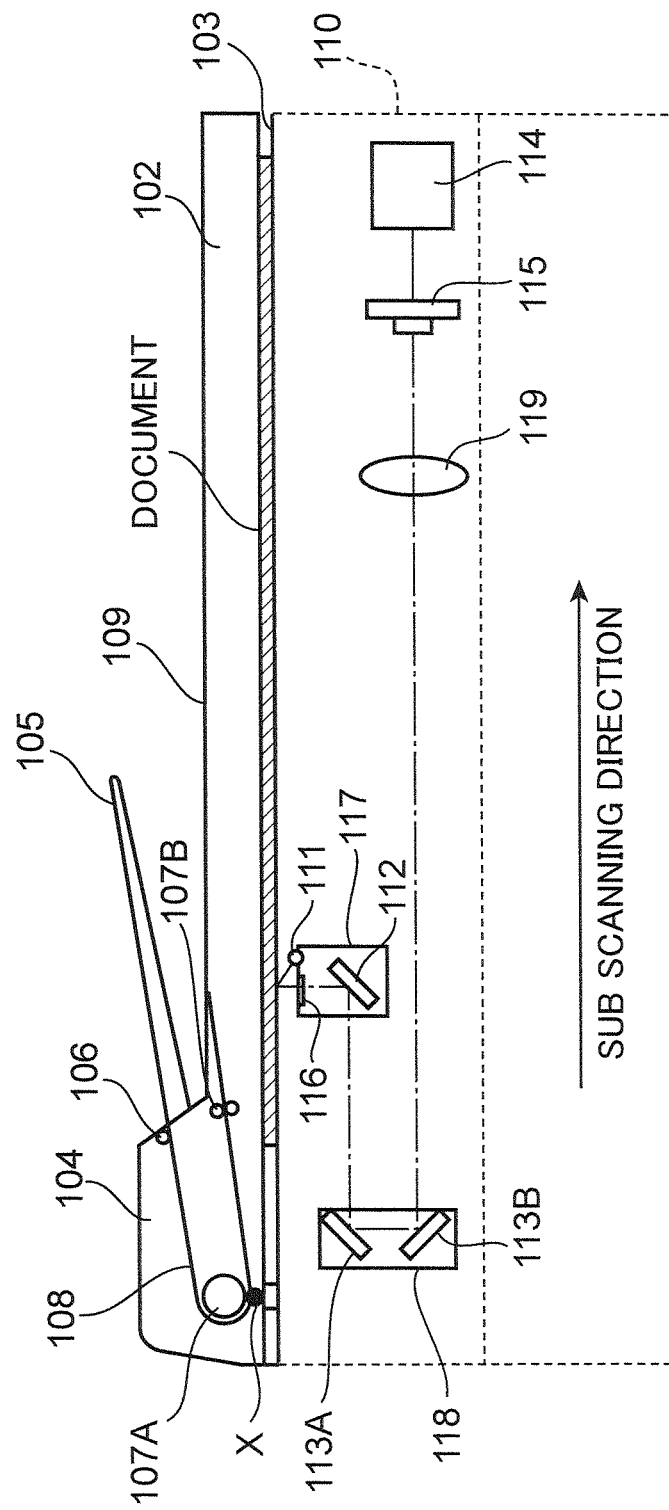
FIG. 2 is a schematic side view illustrating a configuration example of the reading unit.

The reading unit 110 is provided below the contact glass 103. FIG. 2 is a schematic side view illustrating a configuration example of the reading unit. As shown in FIG. 2, the reading unit 110 is provided with a first carriage 117. The first carriage 117 is provided with a light source 111 that illuminates the contact glass 103, a slit 116 that selectively passes the light from the document table, and a mirror 112 that guides the light from the document table.

The reading unit 110 is also provided with a second carriage 118, a lens group 119, a CCD (Charge Coupled Device) line sensor 115, and an image data generation unit 114. The second carriage 118 is provided with mirrors 113A, 113B that again reflect the light reflected from the first carriage 117. The lens group 119 optically corrects the light guided by the mirrors 112, 113A, 113B. The CCD line sensor 115 receives the reflected light corrected by the lens group 119. The image data generation unit 114 corrects, as necessary, the electric signal indicating the intensity of the receive light that has been outputted by the CCD line sensor 115.

When the reading unit 110 reads the image of the document conveyed by the automatic document feeder 104, the light source 111 is moved to the position in which the read position X can be illuminated and the light source is caused to emit light. The reading position X is set in advance at a predetermined position of the contact glass 103 as a reading position used in the read processing of the document that uses the automatic document feeder 104. The light emitted from the light source 111 is transmitted by the contact glass 103 and reflected by the document that passes through the reading position X. The reflected light is guided by the slit 116, the mirrors 112, 113A, 113B, and the lens group 119 to the CCD line sensor 115.

The CCD line sensor 115 transmits an analog electric signal indicating the intensity of the received reflected light "R" (red) to the image data generation unit 114. The CCD line sensor 115 also transmits an analog electric signal indicating the intensity of the received reflected light "G" (green) to the image data generation unit 114. Furthermore, the CCD line sensor 115 also transmits an analog electric signal indicating the intensity of the received reflected light "B" (blue) to the image data generation unit 114.

The image data generation unit 114 converts the analog electrical signal inputted from the CCD line sensor 115 into a digital signal. The image data generation unit 114 also corrects the converted digital signal as necessary. The image data generation unit 114 thus generates image data of the object that is to be printed by the below-described printing unit 120.

Further, the reading unit 110 can also read not only the document conveyed by the automatic document feeder 104, but also the image of the document placed on the contact glass 103. When the reading unit 110 reads the image of the document placed on the contact glass 103, the reading unit moves the first carriage 117 in the sub scanning direction, while causing the light source 111 to emit light. Further, in order to ensure a constant optical path length from the light source 111 to the CCD line sensor 115, the reading unit 110 moves the second carriage 118 in the sub scanning direction, for example, at a rate that is half that of the first carriage 117, toward the CCD line sensor 115.

Similarly to the case in which the image of the document conveyed by the automatic document feeder 104 is read, the CCD line sensor 115 receives the reflected light from the document placed on the contact glass 103 that has been guided by the mirrors 112, 113A, 113B. The CCD line sensor 115 generates analog electrical signals indicating the intensity of "R", "G", "B" of the received reflected light. The image data generation unit 114 converts the generated analog electrical signals into digital signals. Further, the image data generation unit 114 corrects, as necessary, the converted digital signals. As a result the image data generation unit 114 generates image data.

As shown in FIG. 1, the printing unit 120 that prints the image data is provided below the reading unit 110 in the main body 101. The image data that are the object of printing by the printing unit 120 are the image data generated by the image data generation unit 114, as described hereinabove, or the image data transmitted by an external device such as a personal computer and received via a network interface 201. The external device is connected to a network 202 such as a LAN connected to the all-in-one machine 100.

An electrophotographic system is used as a printing system of the printing unit 120. More specifically, in this printing system, a photosensitive drum 121 is uniformly charged by a charger 122 and the photosensitive drum 121 is then irradiated by a laser 123. As a result, an electrostatic latent image is formed on the photosensitive drum 121. A toner is caused by a developing device 124 to adhere to the formed electrostatic latent image. As a result, a toner image is formed on the photosensitive drum 121. The formed toner image is then transferred onto paper by a transfer roller 125B.

For example, the developing device 124 (rotary developing device) is rotated about a rotating shaft extending in the front-rear surface direction of the paper sheet shown in FIG. 1. In the developing device 124, developing units in which toners of corresponding colors are stored are disposed at positions facing the photosensitive drum 121. In this state, the latent image on the photosensitive drum 121 is developed by the toners stored in the developing device 124 and transferred onto an intermediate transfer belt (intermediate transfer body) 125A.

The developing device 124 has four developing units 124 (Y), (C), (M), (K) that store respective toners: yellow (Y), cyan (C), magenta (M), and black (K). A full color image is formed on the intermediate transfer belt 125A by repeating the operation of transferring the image to the intermediate transfer belt 125A for each color.

The timing at which irradiation with the laser beam is performed from the laser 123, that is, the exposure timing of the photosensitive drum 121 is adjusted by using a reference mark provided at the intermediate transfer belt 125A and a detection unit that optically detects the reference mark.

The paper sheet onto which the toner image is transferred, that is, the printing medium onto which printing is performed by the printing unit 120 is placed on a feed tray such as a manual feed tray 131 or paper feed cassettes 132, 133, 134.

When printing is performed with the printing unit 120, a paper sheet is pulled out by the pick-up roller 135 from any of the feed trays, from among the paper feed cassettes 132, 133, 134. The pulled-out paper sheet is fed in by a conveyance roller 137 or a register roller 138 between the intermediate transfer belt 125A and the transfer roller 125B. A paper sheet placed on the manual feed tray 131 is fed in by a conveyance roller 136 or a register roller 138 between the intermediate transfer belt 125A and the transfer roller 125B.

The printing unit 120 transfers the toner image located on the intermediate transfer belt 125A to the paper sheet that has been fed between the intermediate transfer belt 125A and the transfer roller 125B. Then, the printing unit 120 transfers the paper sheet with the conveyance belt 126 to a fixing device 127 for fixing the toner image.

The fixing device 127 is provided with a heating roller 128 incorporating a heater and a pressuring roller 129 that is pressed under a predetermined pressure against the heating roller 128. Where the paper sheet is passed between the heating roller 128 and the pressurizing roller 129, a visible image represented by the toner image is fixed to the paper sheet by the heat and the pressure force applied to the paper sheet. In the printing unit 120, the paper sheet that has passed through the fixing device 127 is discharged to the paper discharge tray 130.

<Electrical Configuration of the All-in-One Machine>

Figure 3:
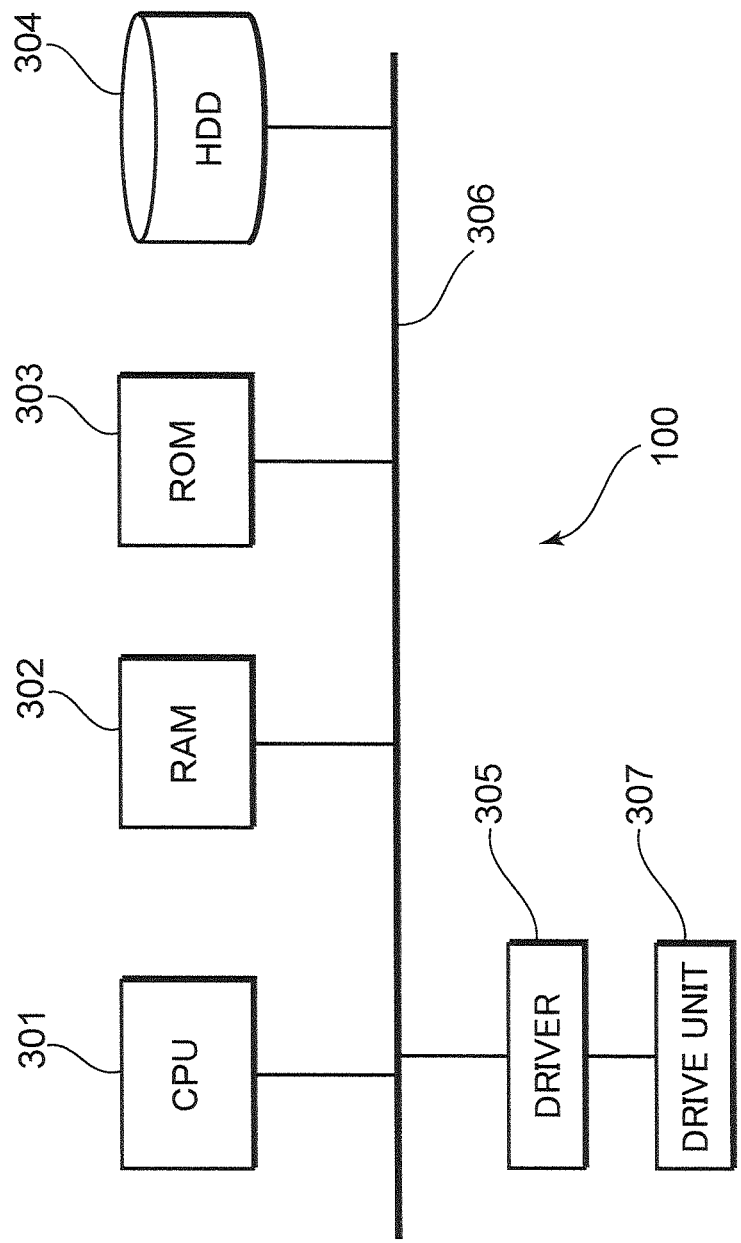
FIG. 3 is a block diagram illustrating an example of the electrical configuration of the all-in-one machine.

The electrical configuration of the all-in-one machine 100 is explained below. FIG. 3 is a block diagram illustrating an example of the electrical configuration of the all-in-one machine. As shown in FIG. 3, in the all-in-one machine 100, a CPU (Central Processing Unit) 301, a RAM (Random Access memory) 302, a ROM (Read Only Memory) 303, a HDD (Hard Disk Drive) 304, and a driver 305 are connected by an internal bus 306. The driver 305 controls the operation of each drive unit 307 operating during the above-described printing processing.

The CPU 301 executes a program stored in the ROM 303 or HDD 304 and uses, for example, the RAM 302 as an operation region for storing data temporarily. The CPU 301 controls the operation of each drive unit 307 by transmitting and receiving data and commands to and from the driver 305 on the basis of the program execution results. Instead of the configuration in which the CPU 301 executes a program for controlling the operation of the drive unit 307, a configuration may be used in which a dedicated circuit for controlling the operation of the drive units 307 is provided in the all-in-one machine 100.

<Relationship Between CCD Line Sensor and Read Position on Contact Glass>

The relationship between the CCD line sensor 115 and the read position X on the contact glass is described below with reference to FIG. 4. FIG. 4A is a schematic diagram illustrating an example of the CCD line sensor 115 used in the all-in-one machine of the present disclosure.

When the image of the document conveyed by the automatic document feeder 104 is read by the reading unit 110, the reflected light that has been reflected from the image of the document through the read position X of the contact glass is reduces in size by the lens group 119 and an image is formed on a plurality of light-receiving elements 115a constituting the CCD line sensor 115. The CCD line sensor 115 converts the reflected light used to form the image into image data indicating the intensity of each color component.

As shown in FIG. 4A, the CCD line sensor 115 is configured to have an elongated shape extending in the main scanning direction (left-right direction in FIG. 4A). The CCD line sensor 115 is constituted, for example, by three photoelectric conversion element rows (line sensors) 115b. In each line sensor 115b, a plurality of light-receiving elements 115a corresponding to image elements, for example, such as photodiodes are arranged one-dimensionally in the main scanning direction.

The three line sensors 115b are provided with respective optical filters that differ from each other in spectral sensitivity. The three line sensors 115b receive the reflected light guided from the read position X on the contact glass after the reflected light has passed through the respectively provided optical filters. More specifically, the three line sensors 115b are provided with optical filters that transmit light rays of wavelengths of "R" (red), "G" (green), and "B" (blue), which are the color components of the three primary colors.

The line sensor ("R" line sensor) 115bR provided with the optical filter transmitting the "R" light outputs an analog electrical signal indicating the intensity (density value) of the red light of the reflected light received by a plurality of light-receiving elements 115a constituting the "R" line sensor. The outputted analog electrical signal is converted by the image data generation unit 114 into a digital signal. As a result, image data ("R" image data) on the "R" color component constituted by density values of the red color of a plurality of pixels respectively corresponding to a plurality of light-receiving elements 115a are generated.

Likewise, the line sensor ("G" line sensor) 115bG provided with the optical filter transmitting the "G" light outputs an analog electrical signal indicating the intensity (density value) of the green light of the reflected light received by a plurality of light-receiving elements 115a constituting the "G" line sensor. The outputted analog electrical signal is digitally converted by the image data generation unit 114. As a result, image data ("G" image data) on the "G" color component constituted by density values of the green color of a plurality of pixels respectively corresponding to a plurality of light-receiving elements 115a are generated.

Further, the line sensor ("B" line sensor) 115bB provided with the optical filter transmitting the "B" light outputs an analog electrical signal indicating the intensity (density value) of the blue light of the reflected light received by a plurality of light-receiving elements 115a constituting the "B" line sensor. The outputted analog electrical signal is digitally converted by the image data generation unit 114. As a result, image data ("B" image data) on the "B" color component constituted by density values of the blue color of a plurality of pixels respectively corresponding to a plurality of light-receiving elements 115a are generated.

The three line sensors 115b are disposed parallel to each other in a preset order with a first spacing 115c therebetween in the sub scanning direction corresponding to the downward direction in FIG. 4. The three line sensors are disposed, for example, as shown in FIG. 4A, in the order of the "R" line sensor 115bR, "G" line sensor 115bG, and "B" line sensor 115bB with the first spacing 115c corresponding to three pixels (three light-receiving elements).

Since the three line sensors 115b are disposed as described hereinabove, when the three line sensors 115b receive the reflected light at the same timing, the light reflected at respectively different positions of the document is received. For example, the light reflected at a predetermined position of the conveyed document is initially received by the "R" line sensor 115bR. As the document is being conveyed, the light reflected at the abovementioned position on the document is then received by the "G" line sensor 115bG and finally by the "B" line sensor 115bB. In other words, the light reflected from the same position on the document is received by the three line sensors 115b at different timings. Such difference in the light reception timing is reflected in the difference between the read positions X corresponding to the line sensors 115b of each color component on the contact glass 103.

FIG. 4B is a schematic diagram illustrating an example of read positions on the contact glass corresponding to the CCD line sensors shown in FIG. 4A. The left-right direction in FIG. 4B corresponds to the main scanning direction, in the same manner as in FIG. 4A.

As shown in FIG. 4B, on the contact glass 103, the reflection positions of the reflected light guided to the line sensors of each color component, that is, the read positions 115x, are determined according to the parallel arrangement mode of the three line sensors. The read positions 115x corresponding to the line sensor of each color component are disposed, for example, with a second spacing 115y, which is the spacing corresponding to the read width of three lines, in the conveyance direction (sub scanning direction) of the document. In FIG. 4B, the read positions are arranged in the order of a "R" read position 115xR corresponding to the "R" line sensor 115bR, a "G" read position 115xG corresponding to the "G" line sensor 115bG, and a "B" read position 115xB corresponding to the "B" line sensor 115bB.

Where the document is conveyed to the read position X on the contact glass 103 shown in FIG. 4B, the one-line image of the conveyed document is initially read by the "R" line sensor 115*b*R at the "R" read position 115*x*R of the "R" line sensor 115*b*R positioned at the front side in the conveyance direction (sub scanning direction) of the document. At this time, at the "G" read position 115*x*G of the "G" line sensor 115*b*G, the image different from the one-line image of the document read at the "R" read position 115*x*R of the "R" line sensor 115*b*R is read by the "G" line sensor 115*b*G, and at the "B" read position 115*x*B of the "B" line sensor 115*b*B, the image different from the one-line image of the document read at the "R" read position 115*x*R of the "R" line sensor 115*b*R is read by the "B" line sensor 115*b*B.

As the document is further conveyed through the second spacing 115*y*, the one-line image of the document that has been read by the "R" line sensor 115*b*R at the "R" read position 115*x*R is read by the "G" line sensor 115*b*G at the "G" read position 115*x*G. Likewise, where the document is further conveyed through the second spacing 115*y*, the one-line image of the document same as mentioned hereinabove is read by the "B" line sensor 115*b*B at the "B" read position 115*x*B.

Thus, the image of the same position on the document is read by the three line sensors 115*b* at read positions 115*x*R, 115*x*G, 115*x*B corresponding to the respective positions of the three line sensors 115*b*. Therefore, the possibility of reading foreign matter that adheres to the contact glass 103 increases.

The foreign matter as referred to herein is not only an adhered matter that adheres to the contact glass 103, but also includes solid non-attached dust or floating dust that adheres temporarily to the contact glass 103. In other words, anything other than an image such as text is included in the foreign matter.

Thus, image data obtained by digital conversion of the analog electrical signals outputted by the three line sensors 115*b* are obtained at respective different read timings. For this reason, a correction (inter-line correction) is usually performed that matches the read timings at which the image data outputted by the three line sensors are obtained so that the image data of each color are obtained by reading the image at the same position of the document.

For example, when the three read positions 115*x* on the contact glass 103 are disposed parallel to each other with the second spacing 115*y*, which is the spacing corresponding to the read width of three lines, in the sub scanning direction, as shown in FIG. 4B, the read timing of the "B" line sensor 115*b*B is taken as a reference. In this case, the read timing when obtaining the image data outputted by the three line sensors can be matched by delaying the read timing of the "G" line sensor 115*b*G by three lines and delaying the read timing of the "R" line sensor 115*b*R by six lines.

<Foreign Matter Detection Procedure>

Figure 5:
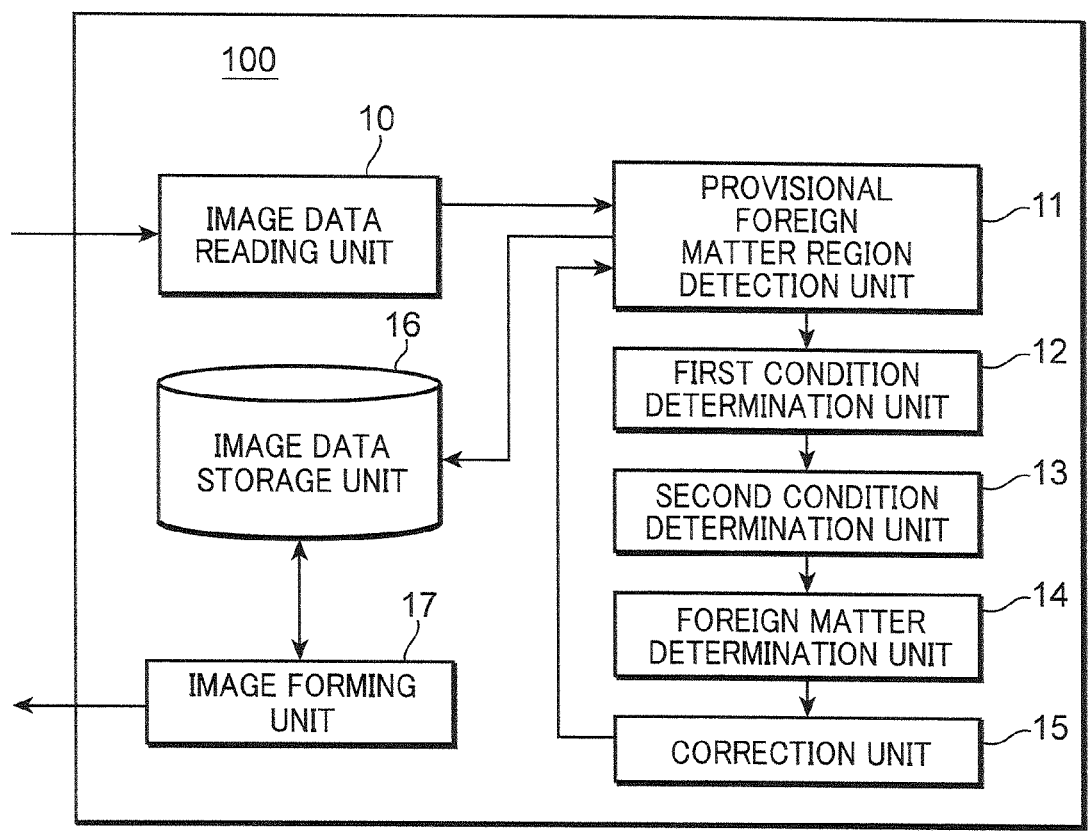
FIG. 5 shows an example of the functional block diagram of the all-in-one machine.
Figure 6:
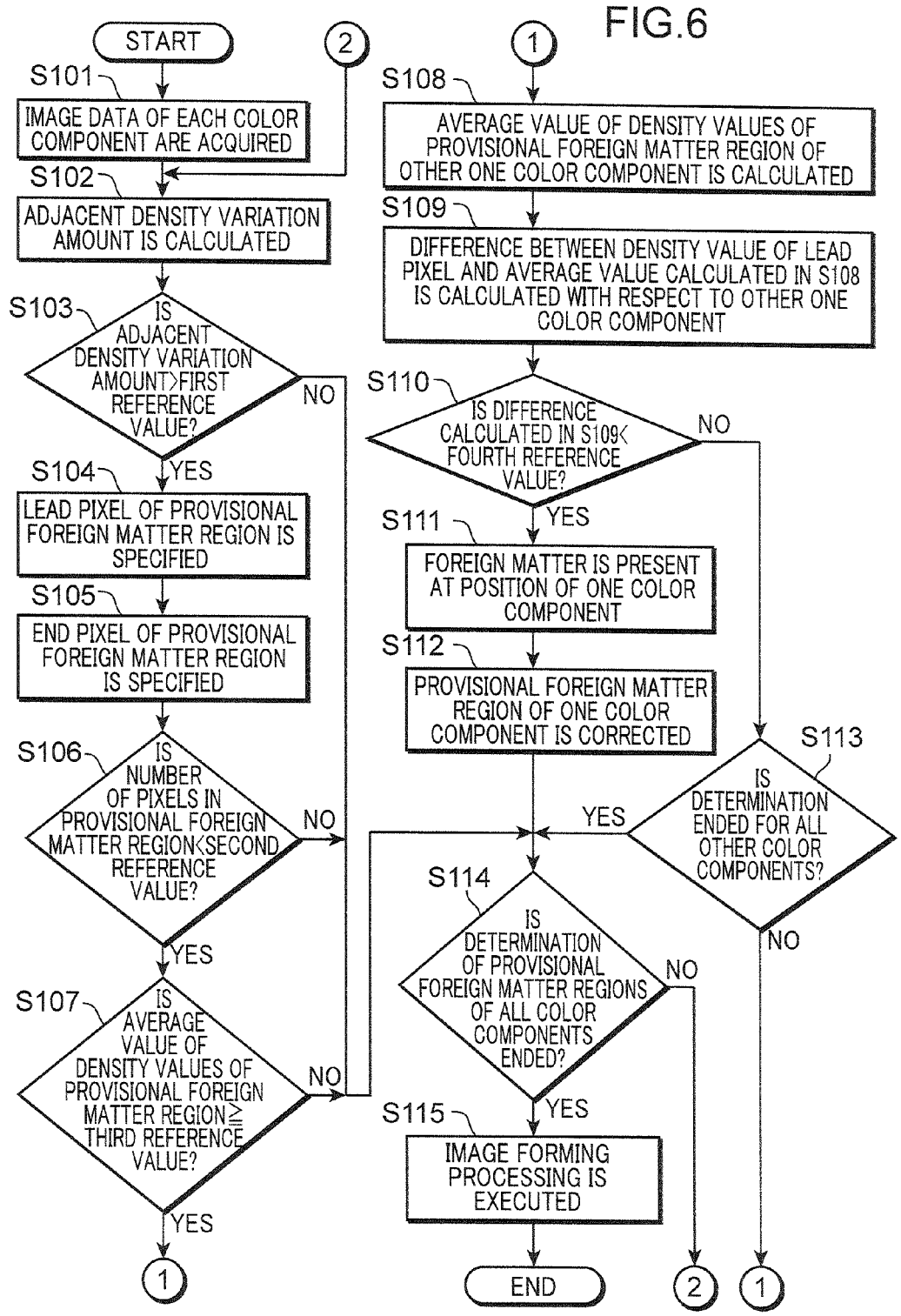
FIG. 6 is a flowchart illustrating an example of the processing of detecting the foreign matter that has adhered to the read position of a certain line sensor.

The procedure by which the all-in-one machine 100 detects foreign matter that has adhered to the read position of a certain line sensor, from among the present line sensors that are equal in number to color components, is explained below with reference to FIG. 5 and FIG. 6. FIG. 5 shows an example of the functional block diagram of the all-in-one machine. FIG. 6 is a flowchart illustrating an example of operations of the processing of detecting the foreign matter that has adhered to the read position of a certain line sensor.

Where the user places a document on the automatic document feeder 104 and presses a start key of the control panel to execute a color copy service on the all-in-one machine 100, the image data reading unit 10 reads the document conveyed by the automatic document feeder 104 and acquires image data on each color component (step S101).

When the image data reading unit 10 acquires the image data on the document conveyed by the automatic document feeder 104, the first carriage 117 is moved below the read position X of the contact glass 103. Then, the image data reading unit 10 radiates light onto the document that has been conveyed by the automatic document feeder 104 to the read position X, and the light reflected at the read position X is received by the CCD line sensor 115 via the slit 116, mirrors 112, 113A, 113B, and lens group 119. The image data reading unit 10 then generates image data of each color component corresponding to the intensity of each color component of the received light with the CCD line sensor 115.

The image data reading unit 10 then performs the predetermined correction (gamma correction, shading correction, inter-line correction) with respect to the generated image data of each color component.

The density value indicated by the image data of each color component according to the embodiment of the present disclosure uses as a reference the number of "256" in 8-bit representation. For example, a density value of "0" indicates the highest density (dark) and a density value of "255" indicates the lowest density (light).

Where the image data are acquired by the image data reading unit 10, a provisional foreign matter region detection unit 11 selects image data of one color component from among image data of each color component (in the explanation below, it is assumed that image data of "B" color component are selected ("B" image data)).

The provisional foreign matter region detection unit 11 then selects one pixel (for example, the pixel corresponding to the light-receiving element 115*a* at the leftmost side in FIG. 4A) from among the pixels constituting the selected "B" image data. Then, the provisional foreign matter region detection unit 11 successively (one by one in the main scanning direction) specifies the pixels arranged in series in the main scanning direction from the selected pixel as target pixels. The provisional foreign matter region detection unit 11 then calculates the absolute value of the difference in density value between the pixels adjacent to the specified target pixel (adjacent density variation amount corresponding to the target pixel) for each target pixel (step S102).

The adjacent density variation amount (a) corresponding to the target pixel is calculated, for example, by the following calculation formula (I) by using the density value (b) of the pixel adjacent to the left side of the target pixel and the density value (c) of the pixel adjacent to the right side of the target pixel in the main scanning direction.

$$a = |c - b| \quad (1)$$

Where the provisional foreign matter region detection unit 11 calculates the adjacent density variation amount corresponding to the target pixel by using the "B" image data ("B" adjacent density variation amount), the first reference value ("B" reference value, for example, "16") that has been set for the "B" image data is acquired from the ROM 303 or the HDD 304, and the "B" adjacent density variation amount is compared with the "B" reference value (step S103). Since the reflectance of light from the foreign matter differs among the color components, a different density value is set in advance for each color component on the basis of test values or the like as the first reference value.

When the result of the comparison performed in step S103 indicates that the "B" adjacent density variation amount exceeds the "B" reference value (step S103: YES), the provisional foreign matter region detection unit 11 specifies the target pixel that has been used when calculating this excessively large "B" adjacent density variation amount as a lead pixel of the provisional foreign matter region (step S104).

FIG. 7A is a graph illustrating an example of image data of each color component obtained when a foreign matter 709 has adhered to the "B" read position 115xB in the case where the density value of the "B" image data 700B is high. FIG. 7B is a schematic diagram illustrating an example of read positions 115xR, 115xG, 115xB of each color component on the contact glass corresponding to image data of each color component shown in FIG. 7A. In FIG. 7A, the positions of the graphs of the "B" image data 700B, image data of the "R" color component ("R" image data) 700R, and image data of the "G" color component ("G" image data) 700G are shifted by predetermined density values with respect to each other to facilitate viewing of the graphs.

When foreign matter adheres to the "B" read position 115xB, the density value of the provisional foreign matter region 701B corresponding to the foreign matter in the "B" image data 700B is less than the density value of other region 702B (region where the foreign matter is not present). Thus, the "B" image data 700B can be found to be represented by a discontinuous curve because the foreign matter is read. The number of pixels in the provisional foreign matter region 701B corresponding to the foreign matter is less than the number of pixels in the regions corresponding to the text or images of the document.

When the target pixel is taken as a pixel 704 (density value "203"), the density value of a pixel 703 adjacent to the left side of the target pixel 704 is "221" and the density value for a pixel 705 adjacent to the right side of the target pixel 704 is "178". Therefore, the provisional foreign matter region detection unit 11 calculates the "B" adjacent density variation amount as "43" (=|"178"−"221"|). Since the calculated "B" adjacent density variation amount "43" exceeds the "B" reference value "16", the provisional foreign matter region detection unit specifies the target pixel 704 as the lead pixel of the provisional foreign matter region 701B (step S104).

Meanwhile, when the result of the comparison performed in step S103 indicates that the "B" adjacent density variation amount exceeding the "B" reference value is not present (step S103: NO), the provisional foreign matter region detection unit 11 determines that the provisional foreign matter region 701B is not present in the "B" image data 700B. In this case, the provisional foreign matter region detection unit 11 ends the foreign matter detection processing in the image data ("B" image data 700B) of one color component selected in step S102. The provisional foreign matter region detection unit 11 then determines whether or not a provisional foreign matter region is present in image data ("R" image data 700R and "G" image data 700G) of other color components which are different from the "B" image data 700B and with respect to which the processing of detecting a provisional foreign matter region has not yet been performed (step S114: NO).

In the case where the lead pixel 704 of the provisional foreign matter region 701B has been specified (step S104), the provisional foreign matter region detection unit 11 specifies an end pixel 706 of the provisional foreign matter region 701B (step S105).

More specifically, the provisional foreign matter region detection unit 11 acquires the density value "203" of the lead pixel 704 of the provisional foreign matter region 701B. The provisional foreign matter region detection unit 11 then specifies the pixel 706 (in FIG. 7A, the density value of the pixel 706 is "210"), for which the density value of the "B" image data 700B is equal to or greater than the density value "203" of the lead pixel 704 and which is the first pixel to appear in the main scanning direction from the lead pixel 704, as the end pixel of the provisional foreign matter region 701B.

When the provisional foreign matter region detection unit 11 has thus specified the lead pixel 704 and the end pixel 706 of the provisional foreign matter region 701B, a first condition determination unit 12 compares the number of pixels constituting the provisional foreign matter region 701B with the second reference value (step S106). A value representing the size of foreign matter corresponding to the detection object is set in advance correspondingly to the type of the foreign matter that is the detection object on the basis of test values obtained in a test run or the like as the second reference value.

When the result of the comparison performed in step S106 indicates that the number of pixels constituting the provisional foreign matter region 701B is less than the second reference value (step S106: YES), the first condition determination unit 12 determines that the first condition indicating that the provisional foreign matter region 701B of the "B" image data 700B corresponds to foreign matter is satisfied.

More specifically, the first condition determination unit 12 acquires the second reference value (referred to hereinbelow as "B" pixel number reference value; this value is, for example, "6") that has been set with respect to the "B" image data from the ROM 303 or the HDD 304. Then, the first condition determination unit 12 compares the number of pixels "5" of the provisional foreign matter region 701B with the "B" pixel number reference value "6" (step S106). Since the result of the comparison performed in step S106 indicates that the number of pixels "5" of the provisional foreign matter region 701B is less than the "B" pixel number reference value "6" (step S106: YES), the first condition determination unit 12 determines that the provisional foreign matter region 701B corresponds to foreign matter (first condition is satisfied).

As a result, only the provisional foreign matter region constituted by the pixels that are less in number than the second reference value corresponding to the size of a very small foreign matter can be restricted so as to be taken as a target region for determining the presence of foreign matter. Therefore, the detection of foreign matter that is aimed only at very small foreign matter can be realized.

Meanwhile, when the number of pixels of the provisional foreign matter region 701B is equal to or greater than the "B" pixel number reference value (step S106: NO), the first condition determination unit 12 determines that the provisional foreign matter region 701B is a region corresponding to an image, text, or the like, rather than a region corresponding to foreign matter. In other words, the first condition determination unit 12 determines that the provisional foreign matter region is not present in the "B" image data 700B. The provisional foreign matter region detection unit 11 then ends the processing of detecting foreign matter in the "B" image data 700B which are the image data of one color component selected in step S102. The provisional foreign matter region detection unit 11 then determines whether or not a provisional foreign matter region is present in image data ("R" image data 700R and "G" image data 700G) of other color components which are different from the "B" image data 700B and with respect to which the processing of detecting a provisional foreign matter region has not yet been performed (step S114: NO).

When the first condition determination unit 12 determines that the first condition indicating that the provisional foreign matter region 701B corresponds to foreign matter is satisfied (step S106: YES), a second condition determination unit 13 compares the average value of the density values of all of the pixels of the provisional foreign matter region 701B with the third reference value (step S107). A different value is set in advance for each color component as the third reference value. For example, a density value indicating the lightness of the image for which the presence of foreign matter can be clearly identified is set for each color component on the basis of test values obtained by a test run or the like as the third reference value.

When the result of the comparison performed in step S107 indicates that the average value of the density value of all of the pixels of the provisional foreign matter region 701B is equal to or greater than the third reference value (step S107: YES), the second condition determination unit 13 determines that the second condition indicating that the provisional foreign matter region 701B corresponds to foreign matter is satisfied.

More specifically, the second condition determination unit 13 acquires the third reference value (referred to hereinbelow as the "B" region density reference value; this value is for example "70") that has been set with respect to the "B" image data from the ROM 303 or the HDD 304. The second condition determination unit 13 then compares the average value (for example, taken as "202") of the density values of all of the pixels of the provisional foreign matter region 701B with the "B" region density reference value "70" (step S107).

In this case, since the average value "200" of the density values of all of the pixels of the provisional foreign matter region 701B is equal to or greater than the "B" region density reference value "70" (step S107: YES), the second condition determination unit 13 determines that the provisional foreign matter region 701B corresponds to foreign matter (second condition is satisfied).

When the average value of the density values of all of the pixels of the provisional foreign matter region 701B is less than the "B" region density reference value (step S107: NO), the second condition determination unit 13 determines that the provisional foreign matter region 701B is a region corresponding to an image, text, and the like, rather than the region corresponding to foreign matter. The provisional foreign matter region detection unit 11 then ends the processing of detecting foreign matter in the "B" image data 700B, which are image data of one color component selected in step S102. The provisional foreign matter region detection unit 11 then determines whether or not a provisional foreign matter region is present in image data ("R" image data 700R and "G" image data 700G) of other color components which are different from the "B" image data 700B and with respect to which the processing of detecting a provisional foreign matter region has not yet been performed (step S114: NO).

Figure 8A:
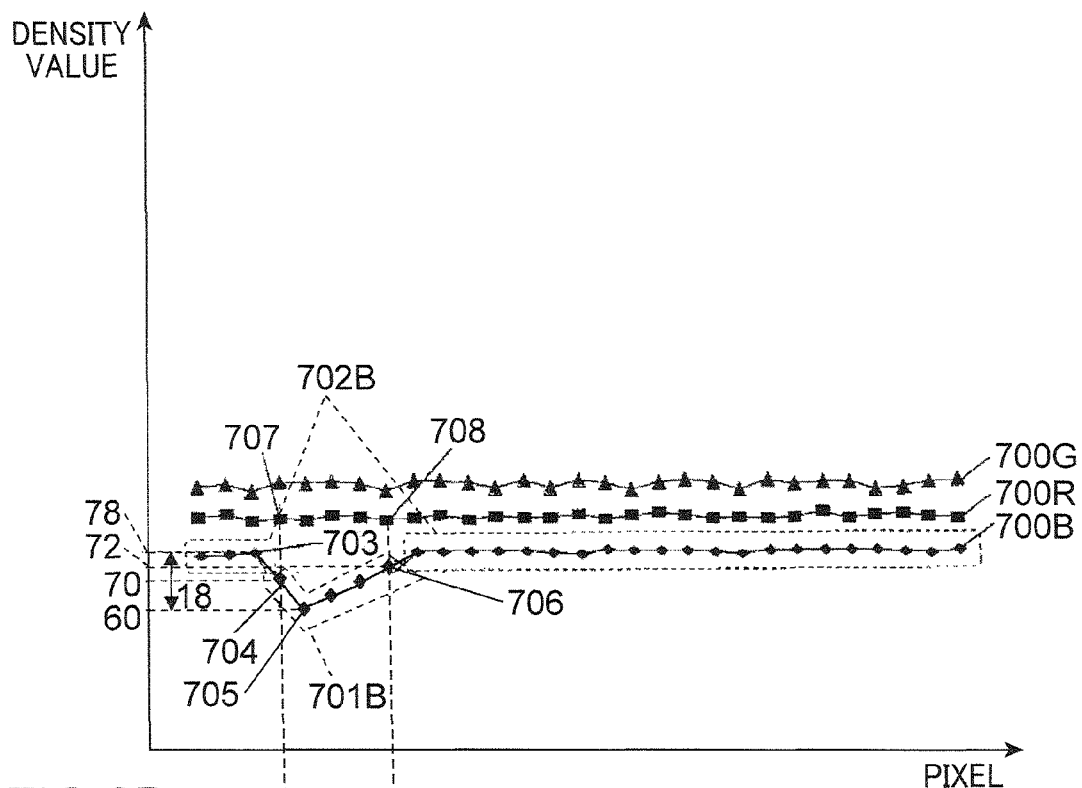
FIG. 8A is a graph illustrating an example of image data of each color component obtained when foreign matter has adhered to the "B" read position, this example being different from that illustrated by FIG. 7A.
Figure 8B:
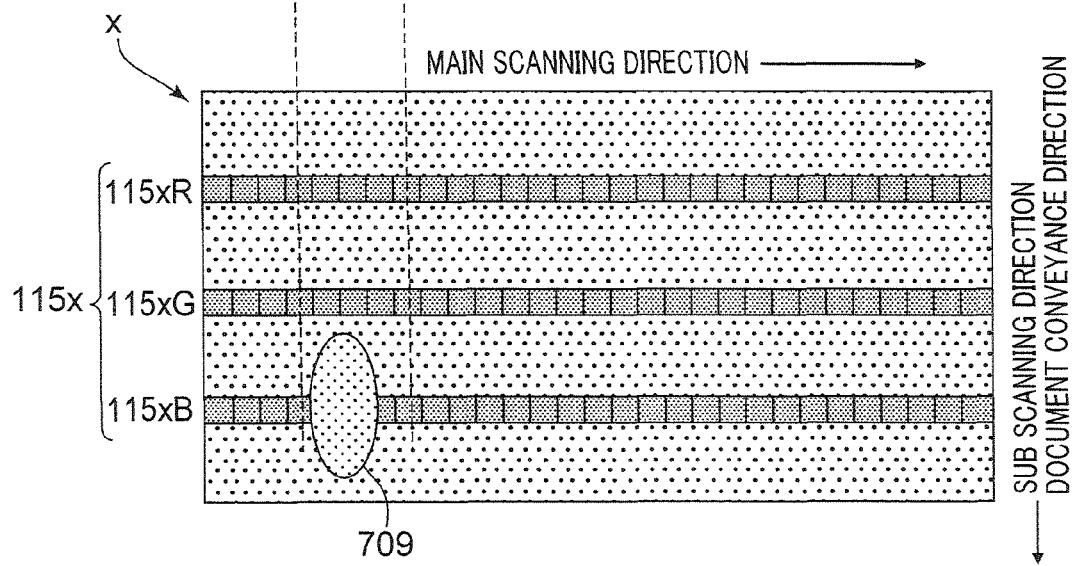
FIG. 8B illustrates an example of read positions of each color component on the contact glass corresponding to image data of each color component shown in FIG. 8A.

FIG. 8A is a graph illustrating an example of image data of each color component obtained when the foreign matter 709 has adhered to the "B" read position 115xB in the case where the density value of the "B" image data is low. FIG. 8B illustrates an example of read positions 115xR, 115xG, 115xB of each color component on the contact glass corresponding to image data of each color component shown in FIG. 8A. In FIG. 8A, the positions of the graphs of the "B" image data 700B, "R" image data 700R, and "G" image data 700G are shifted by predetermined density values with respect to each other to facilitate viewing of the graphs.

Referring to FIG. 8A, when the target pixel is taken as the pixel 704 (density value "70"), the density value of the pixel 703 adjacent to the left side of the target pixel 704 is "78" and the density value of the pixel 705 adjacent to the right side of the target pixel 704 is "60". Therefore, the provisional foreign matter region detection unit 11 calculates "18" (=|"60"−"78"|) as the "B" adjacent density variation amount. Since the calculated "B" adjacent density variation amount "18" exceeds the "B" reference value "16", the provisional foreign matter region detection unit 11 specifies the target pixel 704 as the lead pixel of the provisional foreign matter region 701B (step S104).

The provisional foreign matter region detection unit 11 then specifies the pixel 706 (in FIG. 8A, the density value of the pixel 706 is "72"), for which the density value of the "B" image data 700B is equal to or greater than the density value "70" of the lead pixel 704 and which is the first pixel to appear in the main scanning direction from the lead pixel 704, as the end pixel of the provisional foreign matter region 701B (step S105).

When the number of pixels (for example, "5") of the provisional foreign matter region 701B is less than the "B" pixel number reference value (for example, "6") (step S106: YES), the first condition determination unit 12 determines that the provisional foreign matter region 701B of the "B" image data 700B corresponds to foreign matter (the first condition is satisfied). Then, the second condition determination unit 13 compares the average value of the density values of all of the pixels of the provisional foreign matter region 701B with the "B" pixel number reference value (step S107).

In this case, when the average value of the density values of all of the pixels of the provisional foreign matter region 701B (for example, taken as "68") is less than the "B" pixel number reference value (for example, "70") (step S107: NO), the second condition determination unit 13 determines that the provisional foreign matter region 701B of the "B" image data 700B is not a region corresponding to foreign matter (the second condition is not satisfied). In other words, the second condition determination unit 13 determines that the provisional foreign matter region 701B is a region corresponding to an image, text, or the like, rather than a region corresponding to foreign matter.

As a result, only the provisional foreign matter region that is light to a degree such that the average value of the density values of all of the pixels is equal to or greater than the third reference value can be restricted so as to be taken as a target region for determining the presence of foreign matter. In other words, by restricting only a light region in which the average value of the density values of all of the pixels is equal to or greater than the third reference value so as to be taken as a target region for determining the presence of foreign matter, it is possible to avoid the case in which the determination as to whether a density variation is caused by foreign matter or by an image design is performed in a dark region. As a result, the probability of erroneously detecting an original image located in a dark region as foreign matter can be reduced.

Returning to FIG. 6, when the second condition determination unit 13 determines that the provisional foreign matter region 701B corresponds to foreign matter (second condition is satisfied) (step S107: YES), the foreign matter determination unit 14 calculates the average value of the density values of the pixels corresponding to all of the pixels of the provisional foreign matter region 701B in the image data of any one color component, from among image data ("R" image data 700R and "G" image data 700G) of color components other than the "B" image data 700B (step S108).

Then, the foreign matter determination unit 14 calculates a difference (variation amount of image data of the other color component) between the density value of the pixel corresponding to the lead pixel 704 of the provisional foreign matter region 701B in the image data of the other color component and the average value of the density values of all of the pixels corresponding to the provisional foreign matter region 701B in the image data of the other color component that has been calculated in step S108 (step S109).

After the foreign matter determination unit 14 has calculated the difference (variation amount of image data of the other color component) between the density value of the lead pixel corresponding to the lead pixel of the provisional foreign matter region 701B in the image data of the other color component and the average value of the density values of all of the pixels corresponding to the provisional foreign matter region 701B in the image data of the other color component that has been calculated in step S108, the foreign matter determination unit 14 compares the calculated variation amount of the image data of the other color component with the fourth reference value (step S110). Since the reflectance of light by the image differs among the color components, a different value is set in advance for each color component on the basis of test values or the like as the fourth reference value.

When the result of the comparison performed in step S110 indicates that the variation amount of the image data of the other color component calculated in step S109 is less than the fourth reference value (step S110: YES), the foreign matter determination unit 14 determines that foreign matter is present at the read position 115$x$B corresponding to the line sensor 115$b$B that has generated the "B" image data 700B which are the image data of the one color component selected in step S102 (step S111).

More specifically, as shown in FIG. 7A, the foreign matter determination unit 14 selects, for example, the "R" image data 700R in step S108. Then, the foreign matter determination unit 14 specifies a lead pixel 707 of the "R" image data 700R corresponding to the lead pixel 704 of the provisional foreign matter region 701B and an end pixel 708 of the "R" image data 700R corresponding to the end pixel 706 of the provisional foreign matter region 701B. The foreign matter determination unit 14 thus specifies a region from the lead pixel 707 to the end pixel 708 as a provisional foreign matter region 701R in the "R" image data 700R that corresponds to the provisional foreign matter region 701B. The foreign matter determination unit 14 then calculates the average value (for example, "219") of the density values of all of the pixels in the provisional foreign matter region 701R.

Then, the foreign matter determination unit 14 calculates in step S109 a difference (variation amount ("R" variation amount)) of the "R" image data 700R) between the density value of the lead pixel 707 of the "R" image data 700R corresponding to the lead pixel 704 of the provisional foreign matter region 701B and the average value of the density values of all of the pixels in the provisional foreign matter region 701R calculated in step S108. For example, where the density value of the lead pixel 707 of the provisional foreign matter region 701R of the "R" image data 700R is "222" and the average value of the density values of all of the pixels in the provisional foreign matter region 701R is "219", the "R" variation amount is calculated as "222"−"219"="3".

Where the foreign matter determination unit 14 calculates the "R" variation amount (for example "3") in step S109, the foreign matter determination unit 14 acquires the fourth reference value (referred to hereinbelow as "R" variation amount reference value; for example, taken as "10"), which has been set with respect to the "R" image data 700R, from the ROM 303 or the HDD 304 and compares the calculated "R" variation amount with the "R" variation amount reference value in step S110.

In this case, the "R" variation amount ("3") is less than the "R" variation amount reference value ("10") (step S110: YES). Therefore, the foreign matter determination unit 14 determines that foreign matter is present at the read position 115$x$B corresponding to the line sensor 115$b$B that generates the "B" image data 700B (step S111).

Thus, the foreign matter determination unit 14 determines that the provisional foreign matter region 701B is a region corresponding to foreign matter by determining that the density variation in the provisional foreign matter region 701R of the "R" image data 700R corresponding to the provisional foreign matter region 701B is small. In other words, the foreign matter determination unit 14 determines that the foreign matter 709 has not adhered to the "R" read position 115$x$R corresponding to the "R" image data 700R, but that the foreign matter 709 has adhered to the "B" read position 115$x$B corresponding to the "B" image data 700B, as shown in FIG. 7B.

Thus, by executing the steps S108 to S110, it is possible to detect the continuity of the sub scanning direction with respect to the density value in the image data of each color component. Based on the detection results, it is possible to detect the presence of foreign matter at the read position corresponding to the image data of a certain color component.

Returning to FIG. 6, when the result of the comparison performed in step S110 indicates that the variation amount of the image data of the other color component calculated in step S109 is equal to or greater than the fourth reference value (step S110: NO), the foreign matter determination unit 14 determines whether or not the image data ("R" image data 700R, "G" image data 700G) of the other color component are present which are different from the "B" image data 700B and with respect to which the determination processing of steps S108 to S110 has not been performed (step S113).

When the result of determination performed in step S113 indicates that the image data of the other color component with respect to which the determination processing of steps S108 to S110 has not been performed are present (step S113: NO), the foreign matter determination unit 14 executes the determination processing of steps S108 to S110 with respect to the image data of the other color component with respect to which the determination processing of steps S108 to S110 has not been performed.

A specific example different from the above-described specific example is explained below. When the result of the comparison performed in step S110 indicates that the "R" variation amount is equal to or greater than the "R" variation amount reference value (step S110: NO), the provisional foreign matter region 701R of the "R" image data 700R is, for example, an image such as a scenery image or a black spot image, and the "R" variation amount can increase due to variations in the density value of this image.

Accordingly, the foreign matter determination unit 14 further executes the processing of steps S108 to S110 also with respect to the "G" image data 700G with respect to which the determination processing of steps S108 to S110 has not been performed. When the "G" variation amount calculated in step S109 is less than the fourth reference value ("G" variation amount reference value) corresponding to the "G" image data 700G (step S110: YES), the foreign matter determination unit 14 determines that foreign matter is present at the read position 115$x$B corresponding to the line sensor 115$b$B that has read the "B" image data (step S111).

In other words, it is possible that the provisional foreign matter region 701B and the provisional foreign matter region 701R of the "R" image data 700R corresponding to the provisional foreign matter region 701B are the regions showing an image. However, in the "G" image data 700G, the variation in density of the region corresponding to the provisional foreign matter region 701B decreases. Therefore, the foreign matter determination unit 14 determines that the region corresponding to the provisional foreign matter region 701B is not a region showing an image. As a result, the foreign matter determination unit 14 determines that the variation in density in the provisional foreign matter region 701B is caused by foreign matter rather than by an image. In other words, the foreign matter determination unit 14 determines that the foreign matter 709 has adhered to the "B" read position 115xB corresponding to the "B" image data 700B.

Returning to FIG. 6, when the result of determination performed in step S113 indicates that image data of the other color component with respect to which the determination processing of steps S108 to S110 has not been performed are not present (step S113: YES), the provisional foreign matter region detection unit 11 ends the foreign matter detection processing in the image data of the one color component selected in step S102. Then, the provisional foreign matter region detection unit 11 determines whether or not a provisional foreign matter region is present in the image data ("R" image data 700R, "G" image data 700G) of the other color component which are different from the "B" image data 700B and with respect to which the processing of detecting a provisional foreign matter region has not yet been performed (step S114: NO).

When the foreign matter determination unit 14 determines that foreign matter is present at the read position corresponding to the image data of the one color component (step S111), a correction unit 15 corrects the image data of the one color component. More specifically, the correction unit 15 changes the each density value of the provisional foreign matter region of the image data of the one color component so as to obtain a density value (density value for correction) of the pixel adjacent to the lead pixel of the provisional foreign matter region outside the provisional foreign matter region (step S112).

As a result, the each density value of the provisional foreign matter region present in the one color component is changed to the density value of the pixel adjacent to the lead pixel of the provisional foreign matter region outside the provisional foreign matter region. Therefore, the density values of the correction zone in the one color component after the correction are prevented from being substantially lower than the density value of another region which is a region outside the provisional foreign matter region.

Where the image data of the one color component are corrected in step S112, the provisional foreign matter region detection unit 11 ends the foreign matter detection processing in the image data of the one color component selected in step S102. The provisional foreign matter region detection unit 11 then determines whether or not the processing of determining whether or not provisional foreign matter region is present has been performed with respect to the image data of all of the color components (step S114).

When the processing of determining whether or not provisional foreign matter region is present has not been performed with respect to the image data of all of the color components (step S114: NO), the provisional foreign matter region detection unit 11 selects image data (for example, "G" image data, "R" image data) of another color component for which the processing of detecting a provisional foreign matter region has not been performed and executes the processing of detecting the provisional foreign matter region with respect to the selected image data (step S102).

Meanwhile, where the processing of determining whether or not foreign matter is present has been performed and completed with respect to the image data of all of the color components (step S114: YES), the provisional foreign matter region detection unit 11 executes an image processing such as color correction with respect to the image data and successively stores the image data of each color component in an image data storage unit 16. An image forming unit 17 acquires the image data from the image data storage unit 16 and executes the image forming processing by using the acquired image data (step S115).

In an image reading apparatus in which color copying of a document conveyed by an automatic document feeder is executed, it is difficult to distinguish accurately between a streaky image in the sub scanning direction that has appeared because foreign matter has been read and a linear image extending in the conveyance direction in the document, the two images appearing in the image obtained by reading the document. Those images are particularly difficult to distinguish from one another in the case where a document including a dark image with a low density value is read because the variations in the density value caused by the foreign matter are small.

However, with the configuration of the first embodiment, when the detection of foreign matter adhered to the read position 115x corresponding to the line sensor 115b of each color component is executed for each color component of the line sensor 115b, the size of the foreign matter that is the detection object can be restricted by imposing a restriction such as to satisfy the first condition, and the density value of the target region where the presence of foreign matter is determined can be restricted by further imposing a restriction such as to satisfy the second condition. Therefore, even when a linear image is contained in the document image, the image appearing as a result of reading the foreign matter and the linear image can be adequately distinguished from one another and the adhesion of foreign matter to the read position of a certain line sensor from among the line sensors that are equal in number to the color components can be adequately detected.

[Second Embodiment]

In the following explanation of the second embodiment, only the components different from those of the first embodiment are explained in detail. The explanation of components identical to those of the first embodiment is omitted.

Figure 9:
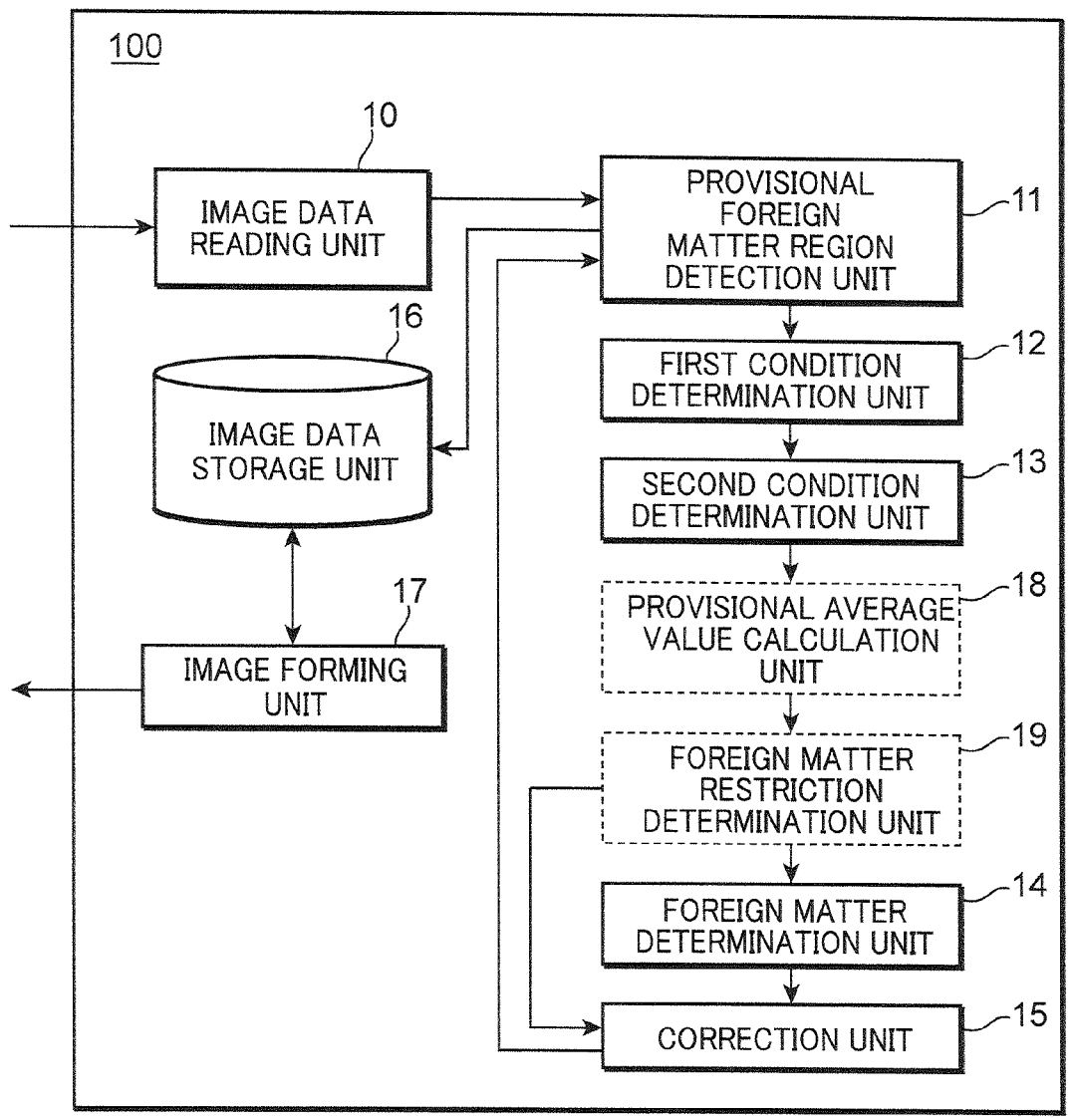
FIG. 9 is a functional block diagram of an all-in-one machine which represents an example other than that shown in FIG. 5.

FIG. 9 is a functional block diagram of an all-in-one machine 100 which represents an example other than that shown in FIG. 5. In the configuration of the second embodiment, as shown in FIG. 9, the all-in-one machine 100 further includes a provisional average value calculation unit 18 and a foreign matter restriction determination unit 19. The procedure in which the all-in-one machine 100 detects foreign matter adhered to the read position of a certain line sensor from among the line sensors that are equal in number to the color components in the configuration of the second embodiment is explained below.

Figure 10:
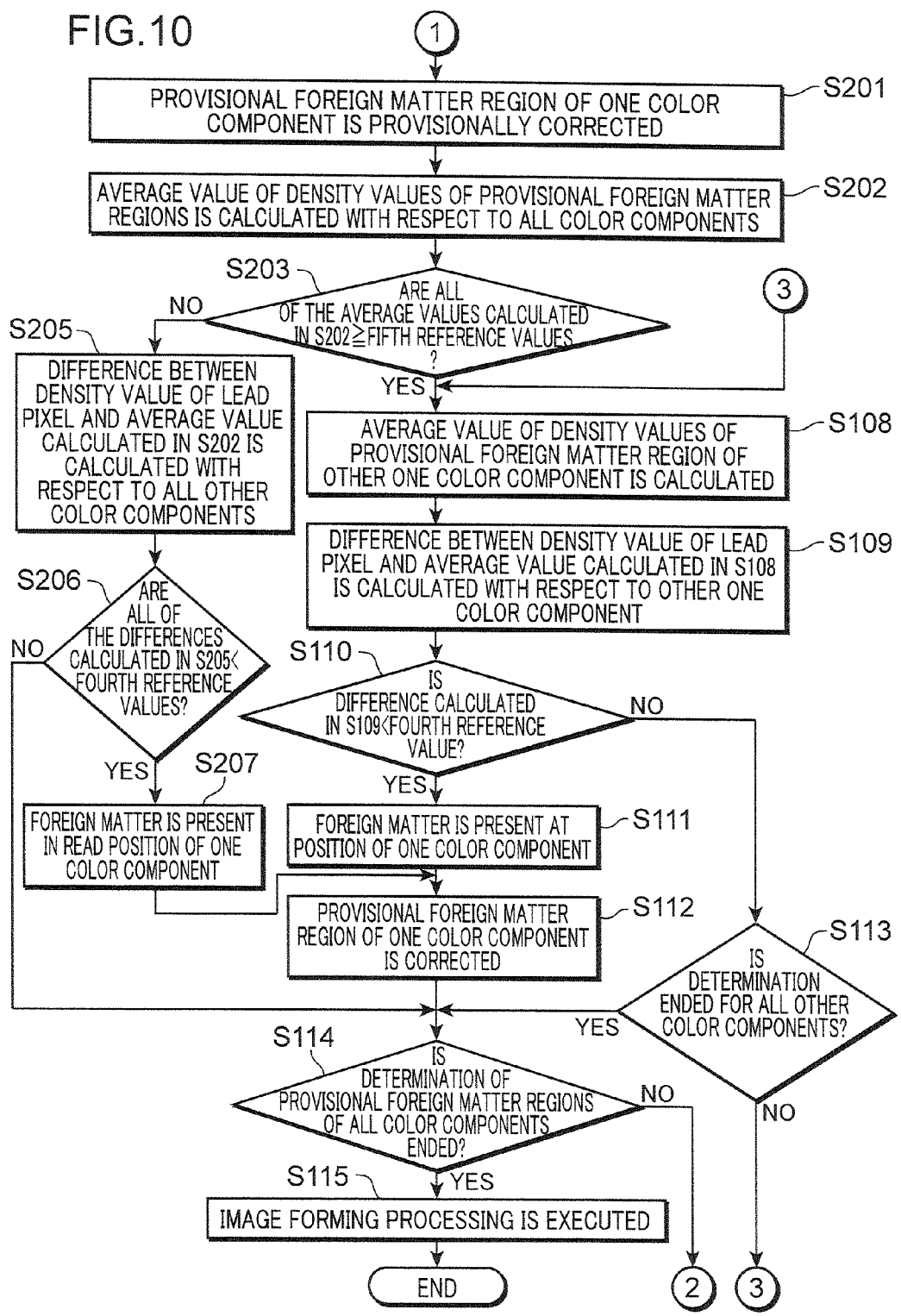
FIG. 10 is an operation flowchart of the processing of detecting the foreign matter that has adhered to the read position of a certain line sensor in an example other than that shown in FIG. 6.

FIG. 10 is an operation flowchart of the processing of detecting the foreign matter that has adhered to the read position of a certain line sensor in an example other than that shown in FIG. 6. As shown in FIG. 10, when the second condition determination unit 13 determines that the second condition, which indicates that the provisional foreign matter region of the image data of the one color component selected in step S102 (FIG. 6) corresponds to foreign matter, is satisfied (step S107: YES (FIG. 6)), the provisional average value calculation unit 18 provisionally corrects the provisional foreign matter region of the one color component selected in step S102 (FIG. 6) (step S201). More specifically, the provisional average value calculation unit 18 changes the density value of the lead pixel of the provisional foreign matter region of the image data of the one color component selected in step S102 (FIG. 6) to the density value of the pixel adjacent to the lead pixel of the provisional foreign matter region outside the provisional foreign matter region (step S201).

FIG. 11A is a graph illustrating the image data of each color component in the case where the foreign matter 709 has adhered to the "B" read position 115xB in an example other than that illustrated by FIG. 7A and FIG. 8A. FIG. 11B is a schematic diagram illustrating an example of read positions 115xR, 115xG, 115xB of color components on the contact glass corresponding to the image data of the color components shown in FIG. 11A. As a specific example, the case is described below in which, as shown in FIG. 11A, after the provisional foreign matter region 701B of the "B" image data 700B has been detected by the provisional foreign matter region detection unit 11 (steps S101 to S105 (FIG. 6)), the first condition determination unit 12 determines that the provisional foreign matter region 701B is a region corresponding to foreign matter (first conditions is satisfied) (step S106: YES (FIG. 6)) and the second condition determination unit 13 determines that the provisional foreign matter region 701B is a region corresponding to foreign matter (second condition is satisfied) (step S107: YES (FIG. 6)).

In the present specific example, the provisional average value calculation unit 18 changes the density value "110" of the lead pixel 704 of the provisional foreign matter region 701B to the density value "118" of the pixel 703 adjacent to the lead pixel 704 outside the provisional foreign matter region 701B. The provisional average value calculation unit 18 thus provisionally corrects the provisional foreign matter region 701B (step S201).

The density value of the lead pixel of the provisional foreign matter region is thus changed into the density value of the pixel adjacent to the lead pixel of the provisional foreign matter region outside the provisional foreign matter region. Therefore, the density value of the lead pixel of the provisional foreign matter region in one color component after the correction is prevented from being substantially lower than the density value of another region which is a region outside the provisional foreign matter region.

Returning to FIG. 10, the provisional average value calculation unit 18 calculates the average value of the density values of all of the pixels of the provisional foreign matter region that has been provisionally corrected in step S201. The provisional average value calculation unit 18 also calculates average values of the density values of the pixels corresponding to all of the pixels of the provisional foreign matter region for each image data of a color component other than the one color component selected in step S102 (step S202).

More specifically, in step S202, the provisional average value calculation unit 18 calculates the average value (for example, "112") of the density values of all of the pixels of the provisional foreign matter region 701B that has been provisionally corrected in step S201.

The provisional average value calculation unit 18 also specifies the lead pixel 707 corresponding to the lead pixel 704 of the provisional foreign matter region 701B and the end pixel 708 corresponding to the end pixel 706 of the provisional foreign matter region 701B in the "R" image data 700R. Then, the provisional average value calculation unit 18 calculates the average value (for example, "120") of the density values of all of the pixels from the lead pixel 707 to the end pixel 708 in the "R" image data 700R.

Likewise, the provisional average value calculation unit 18 also specifies the pixels corresponding to the lead pixel 704 and the end pixel 706 of the provisional foreign matter region 701B in the "G" image data 700G. Then, the provisional average value calculation unit 18 calculates the average value (for example, "125") of the density values of all of the pixels from the pixel corresponding to the lead pixel 704 to the pixel corresponding to the end pixel 706 that have been specified in the "G" image data 700G.

Returning to FIG. 10, the foreign matter restriction determination unit 19 compares each of the average values corresponding to all of the color components that have been calculated in step S202 with the respective fifth reference value (step S203). A different value is set in advance for each color component as the fifth reference value. For example, a density value indicating the lightness of the image for which the presence of foreign matter can be clearly identified is set for each color component on the basis of test values obtained by a test run or the like as the fifth reference value.

When the result of comparison performed in step S203 indicates that all of the average values calculated in step S202 are equal to or greater than the fifth reference values (step S203: YES), the foreign matter restriction determination unit 19 causes the foreign matter determination unit 14 to perform the steps from step S108 to step S111 and step S113 (foreign matter determination processing).

Meanwhile, where the result of the comparison performed in step S203 indicates that any one of the average values calculated in step S202 is less than the fifth reference value (step S203: NO), the foreign matter restriction determination unit calculates the difference (variation amount of image data of the other color component) between the density value of the pixel corresponding to the lead pixel of the provisional foreign matter region and the average value calculated in step S202 with respect to image data of all of the color components other than the one color component selected in step S102 (step S205).

More specifically, for example, when the fifth reference value corresponding to the "R" color component is set to "125", since the result of the comparison performed in step S203 indicates that the average value "120" corresponding to the "R" image data 700R, from among all of the average values calculated in step S202, is less than "125", which is the fifth reference value corresponding to the "R" color component (step S203: NO), the foreign matter restriction determination unit 19 executes step S205.

In step S205, the foreign matter restriction determination unit 19 calculates in the "R" image data 700R the difference (variation amount of "R" image data 700R ("R" variation amount)) between the density value of the lead pixel 707 corresponding to the lead pixel 704 of the provisional foreign matter region 701B and the average value "120" of the density values of all of the pixels from the lead pixel 707 to the end pixel 708 in the "R" image data 700R calculated in step S202. For example, when the density value of the lead pixel 707 of the provisional foreign matter region 701R of the "R" image data 700R is "132", the "R" variation amount is calculated as "132"−"120"="12".

Likewise, the foreign matter restriction determination unit 19 calculates in the "G" image data 700G the difference (variation amount of "G" image data 700G ("G" variation amount)) between the density value of the lead pixel corresponding to the lead pixel 704 of the provisional foreign matter region 701B and the average value "125" of the density values of all of the pixels from the lead pixel to the end pixel corresponding to the provisional foreign matter region 701B in the "G" image data 700G calculated in step S202. For example, when the density value of the lead pixel corresponding to the lead pixel 704 of the provisional foreign matter region 701B in the "G" image data 700G is "131", the "G" variation amount is calculated as "131"−"125"="6".

Returning to FIG. 10, in step S205, the foreign matter restriction determination unit 19 calculates the variation amounts corresponding to the image data of all of the color components other than the one color component selected in step S102, and then compares each of the calculated variation amounts corresponding to the image data of all other color components with the respective fourth reference value (step S206). The fourth reference value is identical to the fourth reference value used in step S110 (FIG. 6).

When the result of the comparison performed in step S206 indicates that all of the variation amounts corresponding to the image data of all of the other color components that have been calculated in step S205 are less than the fourth reference values (step S206: YES), the foreign matter restriction determination unit 19 determines that foreign matter is present at the read position 115x corresponding to the line sensor 115b that has generated the image data of the one color component selected in step S102 (step S207).

Meanwhile, where the result of the comparison performed in step S206 indicates that any one of the variation amounts corresponding to the image data of all of the other color components that have been calculated in step S205 is equal to or greater than the fourth reference value (step S206: NO), the provisional foreign matter region detection unit 11 determines that the provisional foreign matter region detected in the image data of the one color component selected in step S102 is not a region corresponding to foreign matter. In other words, steps S205 to S207 constitute an example of foreign matter restriction determination processing according to the present disclosure.

More specifically, for example, when the fourth reference value corresponding to the "R" color component is "10", since the result of the comparison performed in step S206 indicates that the "R" variation amount ("12") calculated in step S205 is equal to or greater than the fourth reference value ("10") corresponding to the "R" color component (step S206: NO), the provisional foreign matter region detection unit 11 determines that the provisional foreign matter region 701B is not a region corresponding to foreign matter.

In the image data of other color components in which the average value of the density values of all of the pixels corresponding to the provisional foreign matter region is less than the fifth reference value, the difference between the density value of the pixel corresponding to the lead pixel of the provisional foreign matter region in the image data of the other color components and the average value of the density values of the pixels corresponding to all of the pixels of the provisional foreign matter region in the image data of the other color components can be less than the fourth reference value. In this case, the region corresponding to the provisional foreign matter region in the image data of the other color components is an image that is dark to a degree such that the density value becomes less than the fifth reference value. Therefore, it is impossible to distinguish clearly whether the difference in density that is less than the fourth reference value is a difference in density that is caused by the adhesion of foreign matter to the region corresponding to the provisional foreign matter region or a difference in density that is caused by density variations in the image.

According to the configuration of the second embodiment, when image data of other color components are present for which the cause for the difference in density cannot be clearly identified, as mentioned hereinabove, and the region corresponding to the provisional foreign matter region is a dark region, a difference between the density value of the pixel corresponding to the lead pixel of the provisional foreign matter region and the average value of the density values of the pixels corresponding to all of the pixels of the provisional foreign matter region is calculated in the image data of all of the other color components. Then, it is determined that foreign matter is present at the read position 115x corresponding to the line sensor 115b that has read the image data of the selected one color component only when all of the differences corresponding to the image data of all of the other color components are small enough to be less than the fourth reference values, that is, only when density variations are small.

In other words, in the configuration of the second embodiment, there are more opportunities to determine that the difference between the density value of the pixel corresponding to the lead pixel of the provisional foreign matter region and the average value of the density values of the pixels corresponding to all of the pixels of the provisional foreign matter region is less than the fourth reference value than in the configuration in which foreign matter is determined to be present at the read position 115x corresponding to the line sensor 115b that has read the image data of the selected one color component when density variations are small to a degree such that the difference between the density value of the pixel corresponding to the lead pixel of the provisional foreign matter region and the average value of the density values of the pixels corresponding to all of the pixels of the provisional foreign matter region is less than the fourth reference value in the image data of any one color component other than the image data of the selected one color component. Therefore, with the configuration of the second embodiment, the probability of erroneously determining that foreign matter is present can be reduced.

[Third Embodiment]

In the following explanation of the third embodiment, only the components different from those of the first embodiment are explained in detail. The explanation of components identical to those of the first embodiment is omitted.

In the configuration of the third embodiment, the all-in-one machine 100 is provided, as shown in FIG. 5, with the image data reading unit 10, provisional foreign matter region detection unit 11, first condition determination unit 12, second condition determination unit 13, foreign matter determination unit 14, correction unit 15, image data storage unit 16, and image forming unit 17. The procedure by which the all-in-one machine 100 detects foreign matter that has adhered to the read position of a certain line sensor, from among the present line sensors that are equal in number to color components, in the configuration of the third embodiment is explained below.

Figure 12:
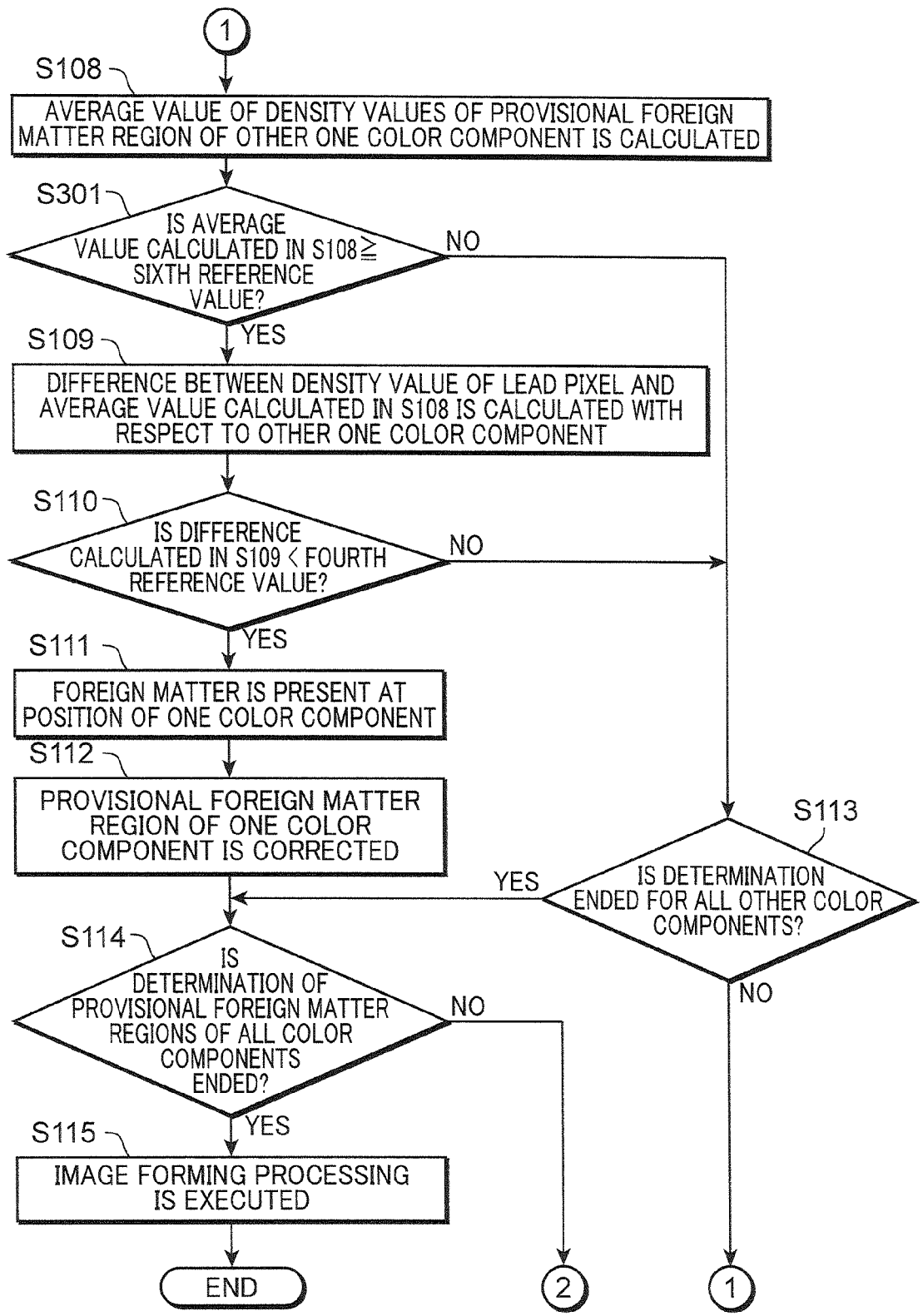
FIG. 12 is an operation flowchart of the processing of detecting the foreign matter that has adhered to the read position of a certain line sensor in an example other than those shown in FIG. 6 and FIG. 10.

FIG. 12 is an operation flowchart of the processing of detecting the foreign matter that has adhered to the read position of a certain line sensor in an example other than those shown in FIG. 6 and FIG. 10. As shown in FIG. 12, when the second condition determination unit 13 determines that the second condition, which indicates that the provisional foreign matter region of the image data of the one color component selected in step S102 (FIG. 6) corresponds to foreign matter, is satisfied (step S107: YES (FIG. 6)), the foreign matter determination unit calculates the average value of the density values of the pixels corresponding to all of the pixels of the provisional foreign matter region in the image data of any one color component, from among the image data of color components other than the image data of the one color component selected in step S102 (FIG. 6) (step S108 (FIG. 6)).

The foreign matter determination unit 14 then compares the average value of the density values of all of the pixels corresponding to the provisional foreign matter region in the image data of the other color component, which has been calculated in step S108, with the sixth reference value (step S301). A different value is set in advance for each color component as the sixth reference value. For example, a density value indicating the lightness of the image for which the presence of foreign matter can be clearly identified is set for each color component on the basis of test values obtained by a test run or the like as the sixth reference value.

When the result of the comparison performed in step S301 indicates that the average value of the density values of all of the pixels corresponding to the provisional foreign matter region in the image data of the other color component, which has been calculated in step S108, is equal to or greater than the sixth reference value (step S301: YES), the foreign matter determination until 14 executes the processing of step S109 and subsequent steps. Meanwhile, when the result of the comparison performed in step S301 indicates that the average value of the density values of all of the pixels corresponding to the provisional foreign matter region in the image data of the other color component, which has been calculated in step S108, is less than the sixth reference value (step S301: NO), the foreign matter determination until 14 executes the processing of step S113 and subsequent steps.

A configuration may be used in which step S301 is executed immediately after the result of the comparison performed in step S110 has indicated that the variation amount of the image data of the other color component calculated in step S109 is less than the fourth reference value (step S110: YES), instead of being executed between step S108 and step S109. A configuration may be also used in which when the result of the comparison performed in step S301 indicates that the average value of the density values of all of the pixels corresponding to the provisional foreign matter region in the image data of the other color component, which has been calculated in step S108, is equal to or greater than the sixth reference value (step S301: YES), the foreign matter determination unit 14 determines that foreign matter is present at the read position 115x corresponding to the line sensor 115b that has read the image data of the selected one color component (step S111).

With the configuration of the third embodiment, when the region corresponding to the provisional foreign matter region in the image data of any other color component is an image with a lightness higher than that indicated by the sixth reference value (step S301: YES) and the density variation in the image data of this other color component is small (step S110: YES), it is determined that foreign matter is present at the read position 115x corresponding to the line sensor 115b that has read the image data of the selected one color component (step S111).

In other words, with the configuration of the third embodiment, when the region corresponding to the provisional foreign matter region in the image data of any other color component is a bright region, the presence of foreign matter is accurately determined by assuming that small density variations in the region corresponding to the provisional foreign matter region are caused by foreign matter rather than by the image.

[Fourth Embodiment]

In the following explanation of the fourth embodiment, only the components different from those of the third embodiment are explained in detail. The explanation of components identical to those of the third embodiment is omitted.

Figure 13:
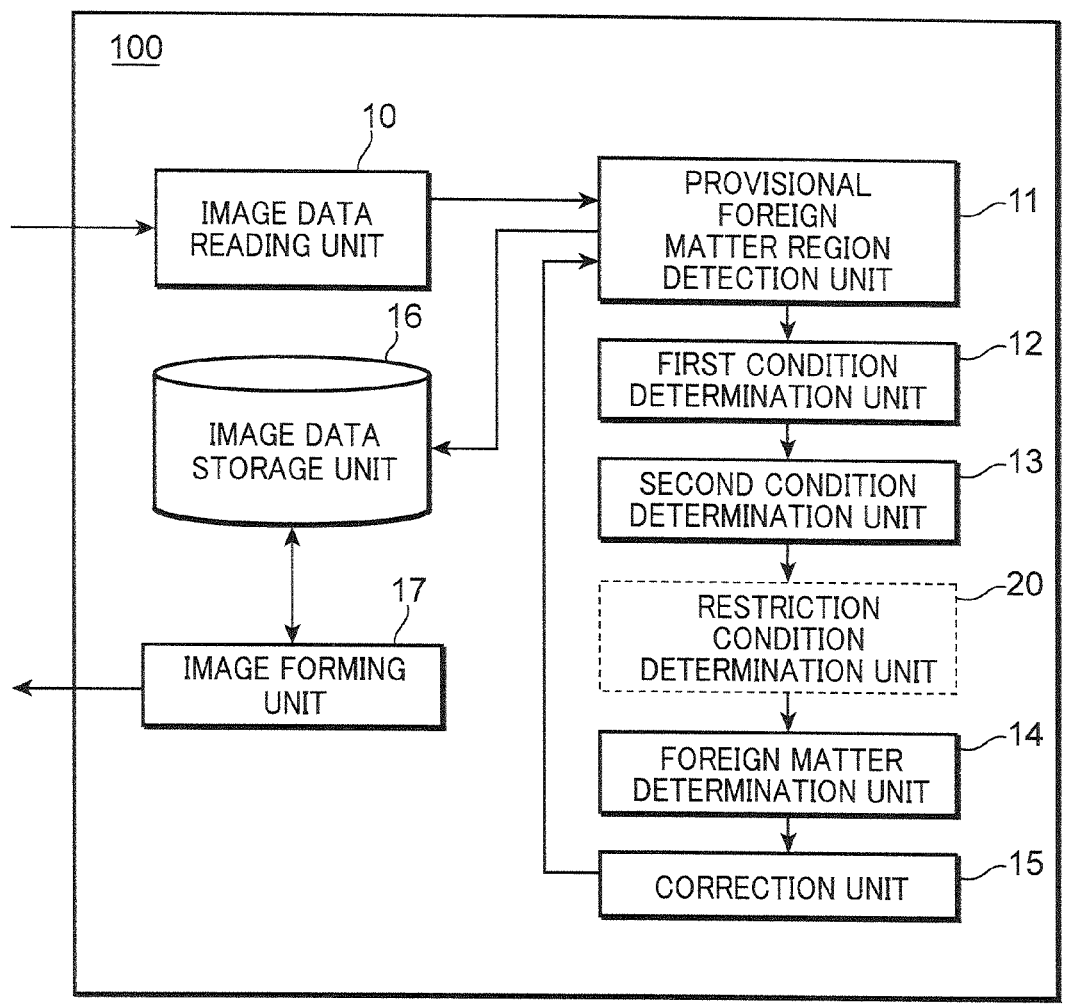
FIG. 13 is a functional block diagram of an all-in-one machine which represents an example other than those shown in FIG. 5 and FIG. 9.

FIG. 13 is a functional block diagram of the all-in-one machine 100 which represents an example other than those shown in FIG. 5 and FIG. 9. In the configuration of the fourth embodiment, as shown in FIG. 13, the all-in-one machine 100 further includes a restriction condition determination unit 20. The procedure by which the all-in-one machine 100 detects foreign matter that has adhered to the read position of a certain line sensor, from among the present line sensors that are equal in number to color components, in the configuration of the fourth embodiment is explained below.

FIG. 14 is an operation flowchart of the processing of detecting the foreign matter that has adhered to the read position of a certain line sensor in examples other than those shown in FIGS. 6, 10, and 12. As shown in FIG. 14, when the second condition determination unit 13 determines that the second condition indicating that the provisional foreign matter region of the image data of the one color component selected in step S102 (FIG. 6) corresponds to foreign matter is satisfied (step S107: YES (FIG. 6)), the restriction condition determination unit 20 determines whether or not a line sensor (separated line sensor) that is not adjacent to the line sensor that has read the image data of the one color component selected in step S102 (FIG. 6) is present (step S401).

When the restriction condition determination unit 20 determines in step S401 that the separated line sensor is not present (step S401: NO), the restriction condition determination unit 20 causes the foreign matter determination unit 14 to perform the foreign matter determination processing (steps S108, S301, S109, S110, S111, and S113) of the third embodiment.

Meanwhile, when the restriction condition determination unit 20 determines in step S401 that the separated line sensor is present (step S401: YES), the restriction condition determination unit 20 calculates the average value of the density values of the pixels corresponding to all of the pixels of the provisional foreign matter region in the image data of the color component corresponding to the separated line sensor in the same manner as in step S108 performed by the foreign matter determination unit 14 (step S402).

Then, the restriction condition determination unit 20 calculates the difference (variation amount of the image data of the color component corresponding to the separated line sensor) between the density value of the pixel corresponding to the lead pixel of the provisional foreign matter region and the average value of the density values of all of the pixels corresponding to the provisional foreign matter region in the image data of the color component corresponding to the separated line sensor, which has been calculated in step S402, in the image data of the color component corresponding to the separated line sensor, in the same manner as in step S109 performed by the foreign matter determination unit 14 (step 403).

The restriction condition determination unit 20 then compares the variation amount of the image data of the color component corresponding to the separated line sensor, which has been calculated in step S403, with the fourth reference value in the same manner as in step S110 performed with the foreign matter determination unit 14 (step S404).

When the result of the comparison performed in step S404 indicates that the variation amount of the image data of the color component corresponding to the separated line sensor, which has been calculated in step S402, is less than the fourth reference value (step S404: YES), the restriction condition determination unit 20 causes the foreign matter determination unit 14 to perform the foreign matter determination processing (steps S108, S301, S109, S110, S111, and S113) of the third embodiment.

Meanwhile, when the result of the comparison performed in step S404 indicates that the variation amount of the image data of the color component corresponding to the separated line sensor is equal to or greater than the fourth reference value (step S404: NO), the restriction condition determination unit 20 ends the foreign matter detection processing in the image data of the one color component selected in step S102, without causing the foreign matter determination unit 14 to perform the foreign matter determination processing of the third embodiment, and performs the processing of step S114 and subsequent steps. In other words, steps S401 to S404 constitute an example of the restriction condition determination processing according to the present disclosure.

More specifically, when the image data of the one color component selected in step S102 is, for example, "B" image data, the restriction condition determination unit 20 determines in step S401 that the line sensor 115bR (FIG. 4A) that is not adjacent to the line sensor 115bB (FIG. 4A), which has read the "B" image data, is present (step S401: YES). In this case, the restriction condition determination unit 20 assumes that the line sensor 115bR is the separated line sensor and executes the processing of step S402 and subsequent steps.

Further, when the image data of the one color component selected in step S102 is, for example, "G" image data, the restriction condition determination unit 20 determines in step S401 that a line sensor that is not adjacent to the line sensor 115bG (FIG. 4A), which has read the "G" image data, is not present (step S401: NO). In this case, the restriction condition determination unit 20 causes the foreign matter determination unit to perform the foreign matter determination processing (steps S108, S301, S109, S110, S111, and S113) of the third embodiment.

When the image data of the one color component selected in step S102 is, for example, "R" image data, the restriction condition determination unit 20 determines in step S401 that the line sensor 115bB (FIG. 4A) that is not adjacent to the line sensor 115bR (FIG. 4A), which has read the "R" image data, is present (step S401: YES). In this case, the restriction condition determination unit 20 assumes that the line sensor 115bB is the separated line sensor and executes the processing of step S402 and subsequent steps.

With the configuration of the fourth embodiment, when the variation amount of the image data of the color component corresponding to the separated line sensor is equal to or greater than the fourth reference value (step S404: NO), the foreign matter detection processing in the image data of the selected one color component is ended and the processing of step S114 and subsequent steps is performed without performing the foreign matter determination processing (steps S108, S301, S109, S110, S111, and S113) of the third embodiment.

In other words, with the configuration of the fourth embodiment, when the density variations in the image data of the color component corresponding to the separated line sensor are large, the density variations in the image data of the color component corresponding to the separated line sensor are determined to be caused by density variations in the image, rather than to result from the fact that the foreign matter present in the line sensor 115b that has read the image data of the selected one color component is large enough to reach the separated line sensor. As a result, the accuracy of determining that foreign matter is present in the line sensor 115b that has read the image data of the selected one color component can be increased over that attained with the configuration of the third embodiment.

In the configurations of the first to fourth embodiments, the provisional foreign matter region detection unit 11 is configured to specify a pixel which has a density value equal to or greater than the density value of the lead pixel of the provisional foreign matter region and is the first to appear in the main scanning direction as the end pixel of the provisional foreign matter region in step S105. However, the provisional foreign matter region detection unit 11 may be also configured to specify a pixel which has a density value equal to or greater than the average value of the density values of the two pixels adjacent to the lead pixel of the provisional foreign matter region and is the first to appear in the main scanning direction as the end pixel of the provisional foreign matter region.

More specifically, as shown in FIG. 7A, the provisional foreign matter region detection unit 11 may be also configured to specify a pixel 706a (for example, the density value of the pixel 706a is "200") which has a density value equal to or greater than the average value "199.5" of the density value "221" of the pixel 703 adjacent to the left side of the lead pixel 704 and the density value "178" of the pixel 705 adjacent to the right side of the lead pixel 704 of the provisional foreign matter region 701B and is the first to appear in the main scanning direction as the end pixel of the provisional foreign matter region 701B.

With such a configuration, a pixel which has a density value equal to or greater than the average value of the density values of the two pixels adjacent to the lead pixel of the provisional foreign matter region and equal to or less than the density value of the lead pixel is not included as a pixel corresponding to the provisional foreign matter region. Therefore, the increase in the number of pixels in the provisional foreign matter region that occurs when a pixel which has a density value equal to or greater than the average value of the density values of the two pixels adjacent to the lead pixel of the provisional foreign matter region and equal to or less than the density value of the lead pixel is included as a pixel corresponding to the provisional foreign matter region can be avoided. As a result, the increase in time relating to the determination of foreign matter can be avoided.

Further, in the configurations of the first to fourth embodiments, the foreign matter determination unit 14 is configured to calculate in step S109 the difference between the density value of the pixel corresponding to the lead pixel in the provisional foreign matter region and the average value of the density values of all of the pixels corresponding to the provisional foreign matter region in the image data of the other color component, which has been calculated in step S108, as a variation amount of the image data of the other color component.

However, the foreign matter determination unit 14 may be instead configured to calculate in step S109 the difference between the density value of a pixel (for example, in FIG. 7A, a pixel that corresponds to the pixel 703, which is adjacent to the lead pixel 704 outside the provisional foreign matter region 701B, and is adjacent to the left side of the pixel 707 in the "R" image data 700R) of the image data of the other color component that corresponds to the pixel adjacent to the lead pixel of the provisional foreign matter region outside the provisional foreign matter region and the average value of the density values of all of the pixels corresponding to the provisional foreign matter region in the image data of the other color component, which has been calculated in step S108, as a variation amount of the image data of the other color component.

Likewise, the foreign matter restriction determination unit 19 is configured such that in step S205 of the second embodiment, the foreign matter restriction determination unit 19 calculates the difference between the density value of the pixel corresponding to the lead pixel of the provisional foreign matter region and the average value of the density values of all of the pixels corresponding to the provisional foreign matter region in the image data of each other color component, which have been calculated in step S202, with respect to the image data of all of the color components other than the one color component selected in step S102 as a variation amount of the image data of each other color component.

However, the foreign matter restriction determination unit 19 may be instead configured to calculate in step S205 of the second embodiment the difference between the density value of the pixel corresponding to the pixel adjacent to the lead pixel of the provisional foreign matter region outside the provisional foreign matter region and the average value of the density values of all of the pixels corresponding to the provisional foreign matter region in the image data of each other color component, which have been calculated in step S202, with respect to the image data of all of the color components as a variation amount of the image data of each other color component.

Likewise, the restriction condition determination unit is configured to calculate in step S403 of the fourth embodiment the difference between the density value of the pixel corresponding to the lead pixel of the provisional foreign matter region and the average value of the density values of all of the pixels corresponding to the provisional foreign matter region in the image data of the color component corresponding to the separated line sensor, which have been calculated in step S402, as a variation amount of the image data of the color component corresponding to the separated line sensor.

However, the restriction condition determination unit 20 may be instead configured to calculate in step S403 the difference between the density value of the pixel corresponding to the pixel adjacent to the lead pixel of the provisional foreign matter region outside the provisional foreign matter region and the average value of the density values of all of the pixels corresponding to the provisional foreign matter region in the image data of the color component corresponding to the separated line sensor, which have been calculated in step S402, as a variation amount of the image data of the color component corresponding to the separated line sensor with respect to the image data of the color component corresponding to the separated line sensor.

With the above-described configuration of the modified foreign matter determination unit 14, foreign matter restriction determination unit 19, and restriction condition determination unit 20, it is possible to avoid using the density values of the pixel corresponding to the lead pixel where foreign matter can be present and to determine accurately the variation in the density value of the region corresponding to the provisional foreign matter region by comparing the density value of the pixel corresponding to the pixel outside the provisional foreign matter region and the average value of the density values of the region corresponding to the provisional foreign matter region. This enables to enhance the accuracy of determining the presence of foreign matter.

Further, in the first to fourth embodiments, the provisional foreign matter region detection unit 11 calculates in step S102 the absolute value (corresponds to the calculation Eq. (1)) in which the density value of the pixel adjacent to the right side of the target pixel is subtracted from the density value of the pixel adjacent to the left side of the target pixel in the main scanning direction and takes the calculated absolute value as an adjacent density variation amount corresponding to the target pixel, but other configurations may be also used.

For example, it is possible to calculate the absolute value of the value obtained by subtracting the density value of the target pixel from the density value of the pixel adjacent to the right side of the target pixel in the main scanning direction and take the calculated absolute value as the adjacent density variation amount corresponding to the target pixel. In other words, a configuration may be used in which the adjacent density variation amount corresponding to the target pixel represents the variation amount of the density value between the pixel adjacent to any one side of the target pixel and the target pixel.

In the first to fourth embodiments, the explanation is performed with respect to copying, but the determination of foreign matter can be similarly performed in facsimile transmission and reception or printing. Further, in the first to fourth embodiments, an all-in-one machine is explained as an example of the image reading apparatus according to the present disclosure, but such an example is not limiting. The image reading apparatus according to the present disclosure may be, for example, a printer, a copier, a scanner, or a FAX.

The present disclosure is not limited to the configurations of the first to fourth embodiments, and various changes thereof can be made. The configurations and processing operations illustrated by FIGS. 1 to 14 merely illustrate the exemplary embodiments according to the present disclosure, and the present disclosure is not limited to the above-mentioned embodiments.

What is claimed is:

1. An image reading apparatus comprising:
an image data reading unit that has, for each color component, a line sensor in which a plurality of light-receiving elements corresponding to pixels are arranged one-dimensionally, and that acquires image data for each color component in which an intensity of reflected light from a read position on a contact glass where a document is conveyed is converted into density values for each pixel by guiding the reflected light to the line sensors;
a provisional foreign matter region detection unit that, when an adjacent density variation amount representing a variation amount of a density value between a target pixel and a pixel adjacent to this target pixel in image data of one color component selected from the image data of each color component exceeds a predetermined first reference value, takes the target pixel as a lead pixel, in sequential comparison of a density value of each pixel arranged in series with the lead pixel with the density value of the lead pixel, takes the very first pixel having a density value equal to or greater than the density value of the target pixel as an end pixel, and detects a pixel group continuing from the lead pixel to the end pixel as a provisional foreign matter region in the image data of the one color component;
a first condition determination unit that, when the provisional foreign matter region detection unit detects a provisional foreign matter region in the image data of the selected one color component and the number of pixels constituting the provisional foreign matter region is less than a predetermined second reference value, determines that a first condition of foreign matter being present at a read position corresponding to a line sensor that has read the image data of the selected one color component is satisfied;
a second condition determination unit that, when the first condition is determined by the first condition determination unit to be satisfied and an average value of density values of all of the pixels within the provisional foreign matter region is equal to or greater than a predetermined third reference value, determines that a second condition of foreign matter being present at a read position corresponding to the line sensor that has read the image data of the selected one color component is satisfied; and
a foreign matter determination unit that performs a foreign matter determination processing that, when the second condition is determined by the second condition determination unit to be satisfied and a difference between the density value of the pixel corresponding to the lead pixel in the provisional foreign matter region and an average value of the density values of the pixels corresponding to all of the pixels in the provisional foreign matter region in the image data of any one color component from among color components other than the selected one color component is less than a predetermined fourth reference value, determines that foreign matter is present at the read position corresponding to the line sensor that has read the image data of the selected one color component.

2. The image reading apparatus according to claim 1, further comprising:
a provisional average value calculation unit that changes the density value of the lead pixel of the provisional foreign image region to a density value of a pixel adjacent to the lead pixel outside the provisional foreign image region, then calculates the average value of the density values of all of the pixels of the provisional foreign image region after the change, and then calculates an average value of the density values of the pixels corresponding to all of the pixels of the provisional foreign image region for each image data of color components other than the selected one color component before the foreign image determination processing is performed by the foreign matter determination unit in the case where the second condition is determined by the second condition determination unit to be satisfied; and
a foreign matter restriction determination unit that performs a foreign matter restriction determination processing that, in the case where all of the average values calculated by the provisional average value calculation unit are equal to or greater than predetermined fifth reference values, causes the foreign matter determination unit to perform the foreign matter determination processing, but in the case where any one of the average values calculated by the provisional average value calculation unit is less than the predetermined fifth reference value, determines that foreign matter is present at the read position corresponding to the line sensor that has read the image data of the selected one color component when a difference between a density value of a pixel corresponding to the lead pixel of the provisional foreign image region and the average value of the density values of the pixels corresponding to all of the pixels of the provisional foreign image region that have been calculated by the provisional average value calculation unit is less than the fourth reference value in the image data of all of the other color components.

3. The image reading apparatus according to claim 1, wherein
in the foreign matter determination processing, the foreign matter determination unit further determines the presence of foreign matter at the read position corresponding to the line sensor that has read the image data of the selected one color component when an average value of the density values of the pixels corresponding to all of the pixels of the provisional foreign matter region is equal to or greater than a predetermined sixth reference value.

4. The image reading apparatus according to claim 3, further comprising:
a restriction condition determination unit that performs a restriction condition determination processing that, when a separated line sensor, which is a line sensor that is not adjacent to the line sensor that has read the image data of the selected one color component, is present before the foreign matter determination processing is performed by the foreign matter determination unit in the case in which the second condition is determined by the second condition determination unit to be satisfied, causes the foreign matter determination unit to perform the foreign matter determination processing only when a difference between the density value of the pixel corresponding to the lead pixel of the provisional foreign matter region and the average value of the density values of the pixels corresponding to all of the pixels of the provisional foreign matter region is less than the fourth reference value in the image data of the color component corresponding to the separated line sensor, but when the separated line sensor is not present, causes the foreign matter determination unit to perform the foreign matter determination processing.

5. The image reading apparatus according to claim 1, wherein
the foreign matter determination unit takes a difference between a density value of a pixel corresponding to a pixel adjacent to the lead pixel of the provisional foreign matter region outside the provisional foreign matter region and the average value of the density values of the pixels corresponding to all of the pixels of the provisional foreign matter region in place of a difference between the density value of the pixel corresponding to the lead pixel of the provisional foreign matter region and the average value of the density values of the pixels corresponding to all of the pixels of the provisional foreign matter region, as an object for comparison with the fourth reference value in the foreign matter determination processing.

6. The image reading apparatus according to claim 2, wherein
the foreign matter restriction determination unit takes a difference between a density value of a pixel corresponding to a pixel adjacent to the lead pixel of the provisional foreign matter region outside the provisional foreign matter region and the average value of the density values of the pixels corresponding to all of the pixels of the provisional foreign matter region in place of a difference between the density value of the pixel corresponding to the lead pixel of the provisional foreign matter region and the average value of the density values of the pixels corresponding to all of the pixels of the provisional foreign matter region that has been calculated by the provisional average value calculation unit, as an object for comparison with the fourth reference value in the foreign matter restriction determination processing; and
the foreign matter determination unit takes a difference between a density value of a pixel corresponding to a pixel adjacent to the lead pixel of the provisional foreign matter region outside the provisional foreign matter region and the average value of the density values of the pixels corresponding to all of the pixels of the provisional foreign matter region in place of a difference between the density value of the pixel corresponding to the lead pixel of the provisional foreign matter region and the average value of the density values of the pixels corresponding to all of the pixels of the provisional foreign matter region, as an object for comparison with the fourth reference value in the foreign matter determination processing.

7. The image reading apparatus according to claim 4, wherein
- the restriction condition determination unit takes a difference between a density value of a pixel corresponding to a pixel adjacent to the lead pixel of the provisional foreign matter region outside the provisional foreign matter region and the average value of the density values of the pixels corresponding to all of the pixels of the provisional foreign matter region in place of a difference between the density value of the pixel corresponding to the lead pixel of the provisional foreign matter region and the average value of the density values of the pixels corresponding to all of the pixels of the provisional foreign matter region, as an object for comparison with the fourth reference value in the image data of the color component corresponding to the separated line sensor in the restriction condition determination processing; and
- the foreign matter determination unit takes a difference between a density value of a pixel corresponding to a pixel adjacent to the lead pixel of the provisional foreign matter region outside the provisional foreign matter region and the average value of the density values of the pixels corresponding to all of the pixels of the provisional foreign matter region in place of a difference between the density value of the pixel corresponding to the lead pixel of the provisional foreign matter region and the average value of the density values of the pixels corresponding to all of the pixels of the provisional foreign matter region, as an object for comparison with the fourth reference value in the foreign matter determination processing.

8. The image reading apparatus according to claim 1, wherein in sequential comparison of the density value of each pixel arranged in series with the lead pixel with the average value of the density values of two pixels adjacent to the lead pixel performed when detecting the provisional foreign matter region, the provisional foreign matter region detection unit takes the very first pixel having a density value equal to or greater than the average value of the density values of the two pixels adjacent to the lead pixel as an end pixel of the provisional foreign matter region.

9. A foreign matter detection method comprising:
- acquiring image data for each color component in which an intensity of reflected light from a read position on a contact glass where a document is conveyed is converted into density values for each pixel by guiding the reflected light to line sensors which are prepared for each color component and in which a plurality of light-receiving elements corresponding to pixels are arranged one-dimensionally;
- when an adjacent density variation amount representing a variation amount of a density value between a target pixel and a pixel adjacent to this target pixel in image data of one color component selected from the image data of each color component exceeds a predetermined first reference value, taking the target pixel as a lead pixel, in sequential comparison of a density value of each pixel arranged in series with the lead pixel with the density value of the lead pixel, taking the very first pixel having a density value equal to or greater than the density value of the target pixel as an end pixel, and detecting a pixel group continuing from the lead pixel to the end pixel as a provisional foreign matter region in the image data of the one color component;
- when a provisional foreign matter region in the image data of the selected one color component is detected in detection of the provisional foreign matter region and the number of pixels constituting the provisional foreign matter region is less than a predetermined second reference value, determining that a first condition of foreign matter being present at a read position corresponding to a line sensor that has read the image data of the selected one color component is satisfied;
- when the first condition is determined to be satisfied and the average value of density values of all of the pixels within the provisional foreign matter region is equal to or greater than a predetermined third reference value, determining that a second condition of foreign matter being present at a read position corresponding to the line sensor that has read the image data of the selected one color component is satisfied; and
- performing a foreign matter restriction determination processing that, when the second condition is determined to be satisfied and a difference between the density value of the pixel corresponding to the lead pixel in the provisional foreign matter region and an average value of the density values of the pixels corresponding to all of the pixels in the provisional foreign matter region in the image data of any one color component from among color components other than the selected one color component is less than a predetermined fourth reference value, determining that foreign matter is present at the read position corresponding to the line sensor that has read the image data of the selected one color component.

10. The foreign matter detection method according to claim 9, further comprising:
- changing the density value of the lead pixel of the provisional foreign image region to a density value of a pixel adjacent to the lead pixel outside the provisional foreign image region, then calculating the average value of the density values of all of the pixels of the provisional foreign image region after the change, and then calculating an average value of the density values of the pixels corresponding to all of the pixels of the provisional foreign image region for each image data of color components other than the selected one color component as a respective provisional average value before the foreign image determination processing is performed in the case where the second condition is determined to be satisfied; and
- performing a foreign matter restriction determination processing that, performing the foreign matter determination processing in the case where all of the average values calculated as the provisional average values are equal to or greater than predetermined fifth reference values, but determining that foreign matter is present at the read position corresponding to the line sensor that has read the image data of the selected one color component when a difference between a density value of a pixel corresponding to the lead pixel of the provisional foreign image region and the average value of the density values of the pixels corresponding to all of the pixels of the provisional foreign image region that have been calculated as the provisional average values is less than the fourth reference value in the image data of all of the other color components in the case where any one of the average values calculated as the provisional average values is less than the fifth reference value.

11. The foreign matter detection method according to claim 9, wherein
- in the foreign matter determination processing, further determination is made that foreign matter is present at the read position corresponding to the line sensor that has read the image data of the selected one color component when an average value of the density values of the pixels corresponding to all of the pixels of the provisional foreign matter region is equal to or greater than a predetermined sixth reference value.

12. The foreign matter detection method according to claim 11, further comprising:
performing a restriction condition determination processing that, when a separated line sensor, which a line sensor that is not adjacent to the line sensor that has read the image data of the selected one color component, is present before the foreign matter determination processing is performed in the case in which the second condition is determined to be satisfied, performing the foreign matter determination processing only when a difference between the density value of the pixel corresponding to the lead pixel of the provisional foreign matter region and the average value of the density values of the pixels corresponding to all of the pixels of the provisional foreign matter region is less than the fourth reference value in the image data of the color component corresponding to the separated line sensor, but when the separated line sensor is not present, performing the foreign matter determination processing.

13. The foreign matter detection method according to claim 9, wherein
a difference between a density value of a pixel corresponding to a pixel adjacent to the lead pixel of the provisional foreign matter region outside the provisional foreign matter region and the average value of the density values of the pixels corresponding to all of the pixels of the provisional foreign matter region is taken in place of a difference between the density value of the pixel corresponding to the lead pixel of the provisional foreign matter region and the average value of the density values of the pixels corresponding to all of the pixels of the provisional foreign matter region as an object for comparison with the fourth reference value in the foreign matter determination processing.

14. The foreign matter detection method according to claim 10, wherein
a difference between a density value of a pixel corresponding to a pixel adjacent to the lead pixel of the provisional foreign matter region outside the provisional foreign matter region and the average value of the density values of the pixels corresponding to all of the pixels of the provisional foreign matter region is taken in place of a difference between the density value of the pixel corresponding to the lead pixel of the provisional foreign matter region and the average value of the density values of the pixels corresponding to all of the pixels of the provisional foreign matter region, which has been calculated as the provisional average value, as an object for comparison with the fourth reference value in the foreign matter restriction determination processing; and
a difference between a density value of a pixel corresponding to a pixel adjacent to the lead pixel of the provisional foreign matter region outside the provisional foreign matter region and the average value of the density values of the pixels corresponding to all of the pixels of the provisional foreign matter region is taken in place of a difference between the density value of the pixel corresponding to the lead pixel of the provisional foreign matter region and the average value of the density values of the pixels corresponding to all of the pixels of the provisional foreign matter region as an object for comparison with the fourth reference value in the foreign matter determination processing.

15. The foreign matter detection method according to claim 12, wherein
a difference between a density value of a pixel corresponding to a pixel adjacent to the lead pixel of the provisional foreign matter region outside the provisional foreign matter region and the average value of the density values of the pixels corresponding to all of the pixels of the provisional foreign matter region is taken in place of a difference between the density value of the pixel corresponding to the lead pixel of the provisional foreign matter region and the average value of the density values of the pixels corresponding to all of the pixels of the provisional foreign matter region as an object for comparison with the fourth reference value in the image data of the color component corresponding to the separated line sensor in the restriction condition determination processing; and
a difference between a density value of a pixel corresponding to a pixel adjacent to the lead pixel of the provisional foreign matter region outside the provisional foreign matter region and the average value of the density values of the pixels corresponding to all of the pixels of the provisional foreign matter region is taken in place of a difference between the density value of the pixel corresponding to the lead pixel of the provisional foreign matter region and the average value of the density values of the pixels corresponding to all of the pixels of the provisional foreign matter region as an object for comparison with the fourth reference value in the foreign matter determination processing.

16. The foreign matter detection method according to claim 9, wherein
in sequential comparison of the density value of each pixel arranged in series with the lead pixel with the average value of the density values of two pixels adjacent to the lead pixel performed when detecting the provisional foreign matter region, the very first pixel having a density value equal to or greater than the average value of the density values of the two pixels adjacent to the lead pixel is taken as an end pixel of the provisional foreign matter region.

* * * * *